(12) United States Patent
Hewitt et al.

(10) Patent No.: US 10,750,908 B2
(45) Date of Patent: Aug. 25, 2020

(54) CONTAINER FOR FOOD PROCESSING SYSTEM

(71) Applicant: SharkNinja Operating LLC, Newton, MA (US)

(72) Inventors: James R. Hewitt, Norfolk, MA (US); Ping Chu, Hong Kong (CN); Nick O'Loughlin, Newton, MA (US); Charles Brunner, North Reading, MA (US); Mark Lance, Newton, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 139 days.

(21) Appl. No.: 15/592,502

(22) Filed: May 11, 2017

(65) Prior Publication Data

US 2017/0245688 A1 Aug. 31, 2017

Related U.S. Application Data

(62) Division of application No. 14/802,706, filed on Jul. 17, 2015, now Pat. No. 9,675,212.

(Continued)

(51) Int. Cl.
*A47J 43/00* (2006.01)
*A47J 43/046* (2006.01)
(Continued)

(52) U.S. Cl.
CPC ......... *A47J 43/0727* (2013.01); *A47J 43/046* (2013.01); *A47J 43/0716* (2013.01);
(Continued)

(58) Field of Classification Search
CPC ................ A47J 43/0727; A47J 43/0716; A47J 43/0722; A47J 43/046; D65D 5/56; D65D 81/38; D65D 81/18; D65D 79/005
See application file for complete search history.

(56) References Cited

U.S. PATENT DOCUMENTS 2,284,155 A * 5/1942 Landgraf .............. A47J 43/046
241/282.2
2,805,697 A * 9/1957 Nieland ................... B26D 1/29
241/282.1

(Continued)

FOREIGN PATENT DOCUMENTS

| CN | 1756501 A | 4/2006 |
|---|---|---|
| CN | 101637242 A | 2/2010 |

(Continued)

OTHER PUBLICATIONS

Application for Registration of an Industrial Design Examiner's Report; Canadaian Application No. 166420; dated May 11, 2016; 2 Pages.

(Continued)

*Primary Examiner* — Faye Francis
(74) *Attorney, Agent, or Firm* — Cantor Colburn LLP

(57) ABSTRACT

A container configured for use with a food processing system includes a container body configurable with a food processing base. The container body includes an interior wall and an exterior wall. The interior will and the exterior wall are arranged in contact at a first end. At least one of the interior wall and the exterior wall is formed from a non-resilient material. A chamber is defined by said container body.

16 Claims, 21 Drawing Sheets

Related U.S. Application Data

(60) Provisional application No. 62/111,244, filed on Feb. 3, 2015.

(51) Int. Cl.
*A47J 43/07* (2006.01)
*B65D 81/38* (2006.01)
*B65D 25/56* (2006.01)
*B65D 79/00* (2006.01)

(52) U.S. Cl.
CPC .......... *A47J 43/0722* (2013.01); *B65D 25/56* (2013.01); *B65D 79/005* (2013.01); *B65D 81/38* (2013.01); *B65D 81/3818* (2013.01)

(56) References Cited

U.S. PATENT DOCUMENTS

| | | | |
|---|---|---|---|
| 3,627,008 A | 12/1971 | Samuellan | |
| 4,194,697 A | 3/1980 | Lembeck | |
| 4,430,557 A | 2/1984 | Eichelberger et al. | |
| 4,600,155 A * | 7/1986 | Bos | A47J 43/046 241/166 |
| 5,233,932 A | 8/1993 | Robertson | |
| 5,613,720 A | 3/1997 | Shaddy | |
| 5,655,805 A | 8/1997 | Shaddy | |
| 5,671,664 A | 9/1997 | Jacobson | |
| 5,918,761 A | 7/1999 | Wissinger | |
| 5,960,709 A | 10/1999 | Yip | |
| 6,050,443 A | 4/2000 | Tung | |
| 6,216,909 B1 | 4/2001 | Lin | |
| 6,450,363 B1 | 9/2002 | Lin | |
| 6,511,031 B2 | 1/2003 | Lin | |
| 6,676,051 B2 | 1/2004 | Rebordosa et al. | |
| 6,786,440 B2 * | 9/2004 | Ling | A47J 43/0727 241/282.1 |
| 6,817,750 B1 | 11/2004 | Sands | |
| 6,971,597 B2 | 12/2005 | Starr | |
| D532,255 S | 11/2006 | Sands | |
| 7,159,808 B2 | 1/2007 | Starr | |
| D549,043 S | 8/2007 | Beesley et al. | |
| D554,427 S | 11/2007 | Sands | |
| D565,353 S | 4/2008 | Roth et al. | |
| 7,530,510 B2 | 5/2009 | Newman et al. | |
| 7,632,007 B2 | 12/2009 | Wulf et al. | |
| D632,918 S | 2/2011 | Gordon | |
| D653,493 S | 2/2012 | Enghard | |
| D655,133 S | 3/2012 | Brinckerhoff et al. | |
| D656,357 S | 3/2012 | Enghard | |
| 8,240,909 B2 * | 8/2012 | Athey | A47J 43/0766 241/282.1 |
| 8,245,873 B2 * | 8/2012 | Steg | B65D 43/0212 220/359.1 |
| 8,393,262 B1 | 3/2013 | Molayem | |
| D683,590 S | 6/2013 | Austin | |
| D690,162 S | 9/2013 | Staton | |
| 8,556,203 B2 * | 10/2013 | Unteregger | A47J 43/0722 241/282.1 |
| D696,062 S | 12/2013 | Picozza et al. | |
| D696,063 S | 12/2013 | Coakley et al. | |
| D697,798 S | 1/2014 | Sorensen et al. | |
| D699,996 S | 2/2014 | De Leo | |
| 8,672,164 B2 | 3/2014 | Honeyghan | |
| D712,196 S | 9/2014 | Ho et al. | |
| D727,097 S | 4/2015 | Sorensen et al. | |
| D731,850 S | 6/2015 | Smith | |
| D734,988 S | 7/2015 | Smith | |
| D737,629 S | 9/2015 | Sands | |
| D739,674 S | 9/2015 | Bergstrom | |
| D744,279 S | 12/2015 | Arciero et al. | |
| D751,344 S | 3/2016 | Charlton | |
| D760,026 S | 6/2016 | Smith et al. | |
| D767,334 S | 9/2016 | Pan | |
| D771,990 S | 11/2016 | Horowitz | |
| D775,892 S | 1/2017 | Smith | |
| D783,355 S | 4/2017 | Tu | |
| D788,527 S | 6/2017 | Smith et al. | |
| D797,505 S | 9/2017 | Tu | |
| D797,506 S | 9/2017 | Tu | |
| D798,668 S | 10/2017 | Steel et al. | |
| D800,499 S | 10/2017 | Repac | |
| D801,108 S | 10/2017 | Pan | |
| 2003/0029876 A1 | 2/2003 | Giraud | |
| 2003/0085228 A1 | 5/2003 | Oakes | |
| 2004/0066705 A1 | 4/2004 | Linz et al. | |
| 2005/0045643 A1 | 3/2005 | Ghanem | |
| 2005/0061821 A1 | 3/2005 | Smith et al. | |
| 2005/0173365 A1 | 8/2005 | McKnight | |
| 2006/0278641 A1 * | 12/2006 | Ziegler | A47G 23/0233 220/212.5 |
| 2007/0109913 A1 | 5/2007 | McGill | |
| 2010/0140282 A1 * | 6/2010 | Steg | B65D 43/0212 220/780 |
| 2010/0276437 A1 * | 11/2010 | Keilberg | B65D 51/20 220/780 |
| 2013/0213978 A1 | 8/2013 | Libourel et al. | |
| 2014/0247686 A1 | 9/2014 | Arnett et al. | |
| 2015/0098299 A1 | 4/2015 | Sapire | |
| 2015/0208844 A1 * | 7/2015 | Liang | A47J 43/042 99/512 |
| 2016/0220071 A1 | 8/2016 | Hewitt et al. | |
| 2017/0245689 A1 | 8/2017 | Hewitt et al. | |
| 2017/0245690 A1 | 8/2017 | Hewitt et al. | |

FOREIGN PATENT DOCUMENTS

| | | |
|---|---|---|
| CN | 203468415 U | 3/2014 |
| EP | 2275013 A1 | 1/2011 |
| EP | 2522261 A1 | 11/2012 |
| JP | 2-10698 | 3/1990 |
| JP | 2-70737 | 5/1990 |
| JP | 2-137940 | 11/1990 |
| JP | 2617623 | 6/1997 |
| JP | 2002-233825 | 8/2002 |
| JP | 2005-324104 | 11/2005 |

OTHER PUBLICATIONS

EP Communication pursuant to Article 94(3) EPC; Application No. 16 705 638.1-1006; dated May 21, 2019; pp. 1-4.
Final Office Action; U.S. Appl. No. 14/802,706, filed Jul. 17, 2015; Container for Food Processing System; dated Apr. 4, 2017; 7 Pages.
Food Machines International General Catalogue; JPO Publicly Known Design No. HC17002749; Oct. 2004; 5 Pages.
International Search Report; International Application No. PCT/US2016/016083; International Filing Date: Feb. 2, 2016; dated Jul. 21, 2016; 8 Pages.
Invitiation to Pay Additional Fees; International Application No. PCT/US2016/016083; International Filing Date: Feb. 2, 2016; dated May 4, 2016; 8 Pages.
Non-Final Office Action; U.S. Appl. No. 14/802,706, filed Jul. 17, 2015; Container for Food Processing System; dated Dec. 4, 2015; 11 Pages.
Non-Final Office Action; U.S. Appl. No. 14/802,706, filed Jul. 17, 2015; Container for Food Processing System; dated Oct. 12, 2015; 12 Pages.
Notice of Allowance and Fees Due; U.S. Appl. No. 29/533,491, filed Jul. 17, 2015; Blender Attachment; dated Nov. 21, 2016; 12 Pages.
Notice of Allowance; Japanese Design Application No. 2016-000591; dated Jul. 22, 2016; 2 Pages.
Notice of Allowance; U.S. Appl. No. 29/594,598, filed Feb. 21, 2017; Blender Attachment; dated May 22, 2017; 16 Pages.
Notice of Allowance; U.S. Appl. No. 29/600,212, filed Apr. 10, 2017; Blender Attachment; dated May 22, 2017; 16 Pages.
Notice of Allowance; U.S. Appl. No. 14/802,706, filed Jul. 17, 2015; Container for Food Processing System; dated Jul. 8, 2016; 7 Pages.
Notice of Allowance; U.S. Appl. No. 14/802,706, filed Jul. 17, 2015; Container for Food Processing System; dated Feb. 14, 2016; 9 Pages.

(56) References Cited

OTHER PUBLICATIONS

Notice of Allowance; U.S. Appl. No. 29/623,722, Oct. 26, 2017; Blender Attachment; dated Nov. 21, 2017; 18 Pages.
Notice of Allowance; U.S. Appl. No. 29/625,144, Nov. 7, 2017; Blender Attachment; dated Nov. 21, 2017; 18 Pages.
Notice of References; Japanese Design Application No. 2016-000591; dated Jul. 19, 2016; 4 Pages.
Notice of the Preliminary Rejection; Korean Application No. 3020160001832; dated May 23, 2016; 2 Pages.
Requirement for Restriction/Election; U.S. Appl. No. 29/594,594, filed Feb. 21, 2017; Blender Attachment; dated May 19, 2017; 15 Pages.
Requirement for Restriction/Election; U.S. Appl. No. 29/600,213, filed Apr. 10, 2017; Blender Attachment; dated May 19, 2017; 15 Pages.
Requirement for Restriction/Election; U.S. Appl. No. 14/802,706, filed Jul. 17, 2015; Container for Food Processing System; dated Sep. 29, 2015; 6 Pages.
Requirement for Restriction/Election; U.S. Appl. No. 29/533,491, filed Jul. 17, 2015; Blender Attachment; dated Aug. 9, 2016; 19 Pages.
Written Opinion of the International Searching Authority; International Application No. PCT/US2016/016083; International Filing Date: Feb. 2, 2016; dated Jul. 21, 2016; 9 Pages.
European Office Action; European Application No. 16705638.1; Filing Date: Feb. 2, 2016; dated May 21, 2019; 4 pages.
Final Office Action; U.S. Appl. No. 15/592,533, filed May 11, 2017; Container for Food Processing System; dated Aug. 30, 2019; 20 pages.
Final Office Action; U.S. Appl. No. 15/592,521, filed May 11, 2017; Container for Food Processing System; dated Aug. 28, 2019; 20 pages.
SUGICO Parts Catalogue; JPO Publicly Known Design No. HC18022081; No. 05P; 3 Pages.
Chinese Office Action; International Application No. 201680009374.7; International Filing Date: Feb. 2, 2016; dated Oct. 8, 2019; 10 pages.
International Search Report daated Nov. 24, 2015 in corresponding International Application No. PCT/JP2015/074797.
Written Opinion of the International Searching Authority dated Nov. 24, 2015 in corresponding International Application No. PCT/JP2015/074797.

\* cited by examiner

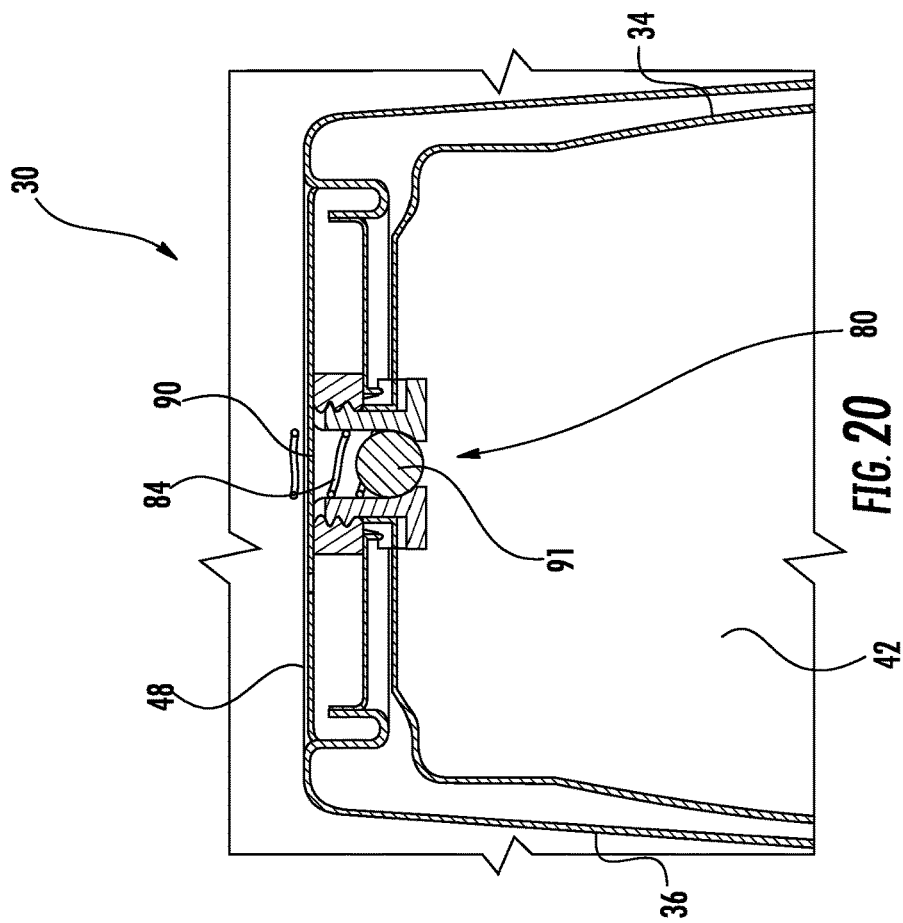
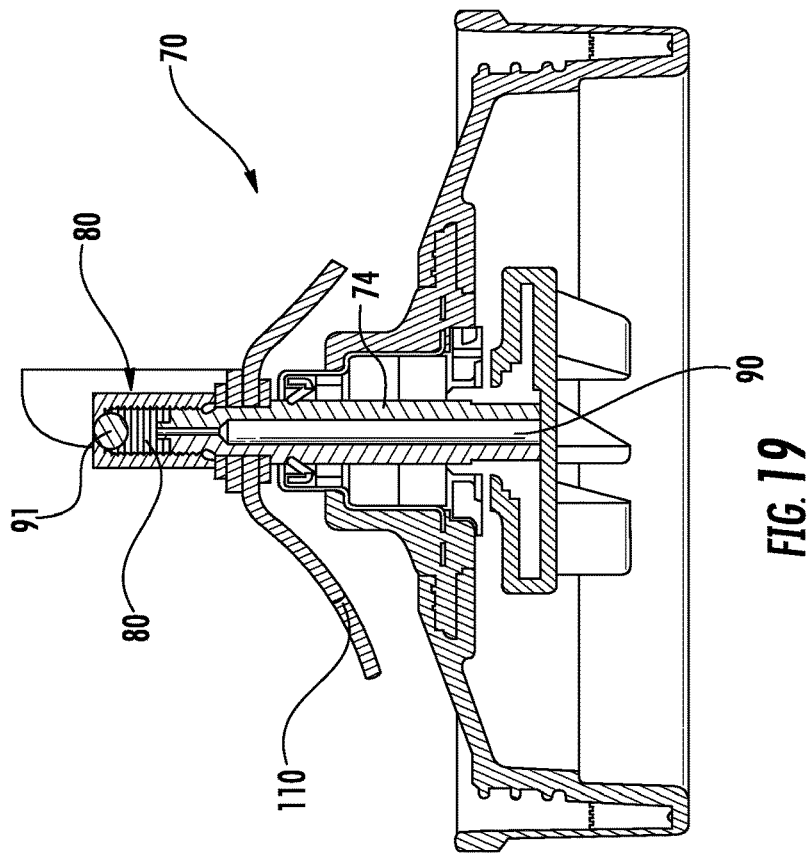

CONTAINER FOR FOOD PROCESSING SYSTEM

CROSS-REFERENCE TO RELATED APPLICATION

This application is a divisional of U.S. patent application Ser. No. 14/802,706, filed Jul. 17, 2015 which claims the benefit of U.S. Provisional Patent Application Ser. No. 62/111,244, filed Feb. 3, 2015, the entire contents of which are incorporated herein by reference.

BACKGROUND

This application is directed to a food processor, and more particularly, to an attachment for use with a food processor.

Food processors, such as blenders generally include containers or multi-sized containers or jars mounted on a base unit. These containers or multi-sized containers or jars are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

SUMMARY

According to one embodiment, a container configured for use with a food processing system includes a container body configurable with a food processing base. The container body includes an interior wall and an exterior wall. The interior wall and the exterior wall are arranged in contact at a first end. At least one of the interior wall and the exterior wall is formed from a non-resilient material. A chamber is defined by said container body.

In addition to one or more of the features described above, or as an alternative, in further embodiments a space is formed between at least a portion of said interior wall and said exterior wall, said space being filled with an insulating material.

In addition to one or more of the features described above, or as an alternative, in further embodiments both said interior wall and said exterior wall are formed from a non-resilient material.

In addition to one or more of the features described above, or as an alternative, in further embodiments the said non-resilient material of said interior wall is substantially identical to said non-resilient material of said exterior wall.

In addition to one or more of the features described above, or as an alternative, in further embodiments said non-resilient material of said interior wall is different than said non-resilient material of said exterior wall.

In addition to one or more of the features described above, or as an alternative, in further embodiments said non-resilient material is a stainless steel material.

In addition to one or more of the features described above, or as an alternative, in further embodiments at least one of said interior wall and said exterior wall is formed from a plastic material.

In addition to one or more of the features described above, or as an alternative, in further embodiments said interior wall and said exterior wall are formed from a single piece of material.

In addition to one or more of the features described above, or as an alternative, in further embodiments said interior wall and said exterior wall are arranged in contact at a second end.

In addition to one or more of the features described above, or as an alternative, in further embodiments said container body includes a protrusion formed in said interior wall.

In addition to one or more of the features described above, or as an alternative, in further embodiments said container body includes a recess formed in said exterior wall, said recess extending towards said chamber.

In addition to one or more of the features described above, or as an alternative, in further embodiments said container body further comprises at least one marking for indicating one or more volumes associated with said chamber.

In addition to one or more of the features described above, or as an alternative, in further embodiments comprising a collar configured to associate said container body with said food processing base, said collar being formed from a resilient material.

In addition to one or more of the features described above, or as an alternative, in further embodiments comprising a cutting assembly configured to couple to said container body and associate said container body with said food processing base, wherein at least portion of said cutting assembly is formed from a resilient material.

In addition to one or more of the features described above, or as an alternative, in further embodiments comprising a pressure relief mechanism associated with said container body and configured to reduce a pressure of said chamber when said pressure exceeds a defined pressure threshold.

In addition to one or more of the features described above, or as an alternative, in further embodiments said defined pressure threshold is between about 2 and 7 psi.

In addition to one or more of the features described above, or as an alternative, in further embodiments said pressure relief mechanism is configured to deform when said pressure within said chamber exceeds said defined pressure threshold.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 19 is a cross-sectional view of yet another pressure relief mechanism of a container configured for use with the food processing system according to an embodiment of the disclosure;

FIG. 20 is a cross-sectional view of yet another pressure relief mechanism of a container configured for use with the food processing system according to an embodiment of the disclosure;

The detailed description explains embodiments of the present disclosure, together with advantages and features, by way of example with reference to the drawings.

DETAILED DESCRIPTION

Figure 1:
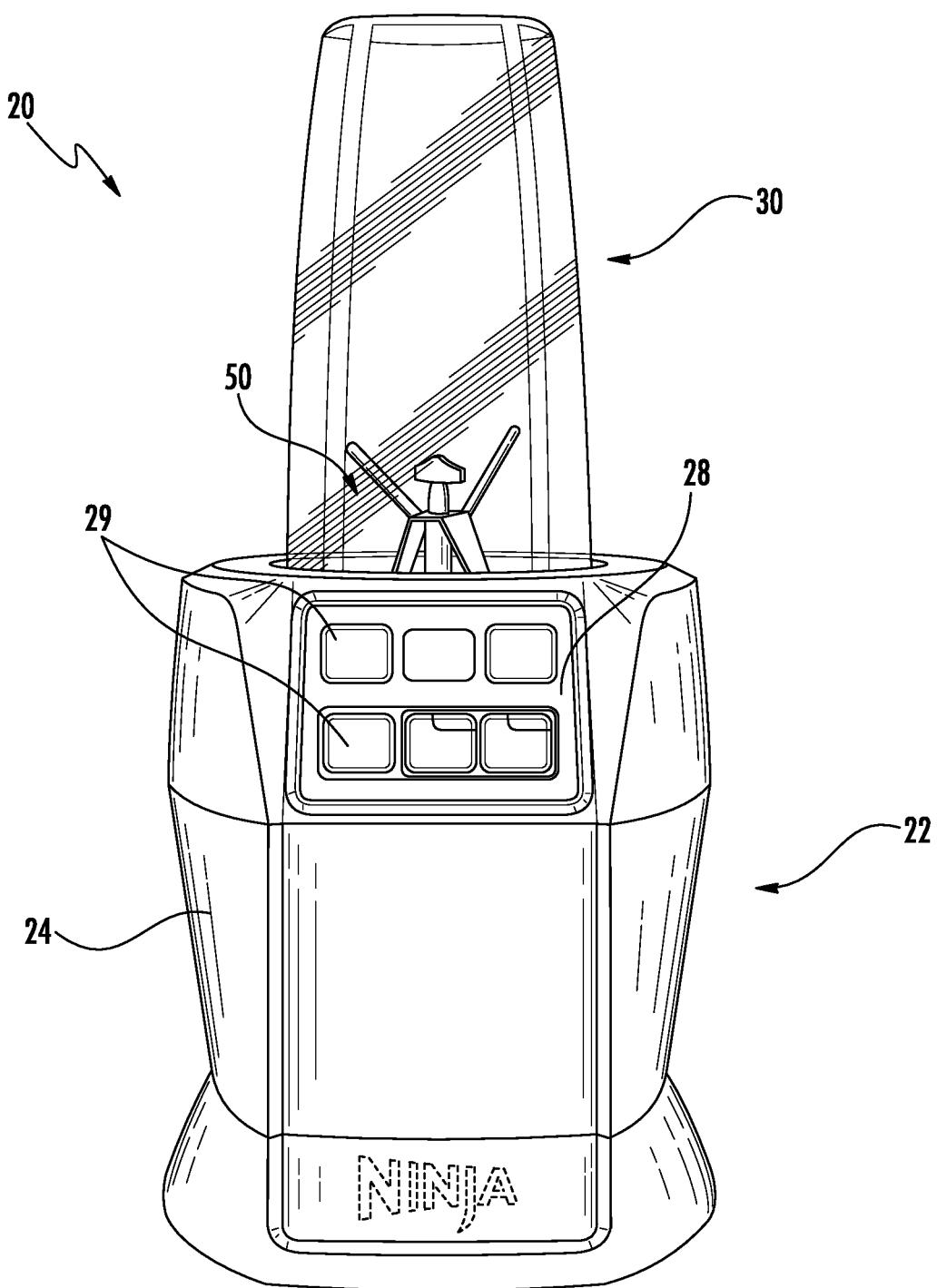
FIG. 1 is a front view of an example of a food processing system.
Figure 2:
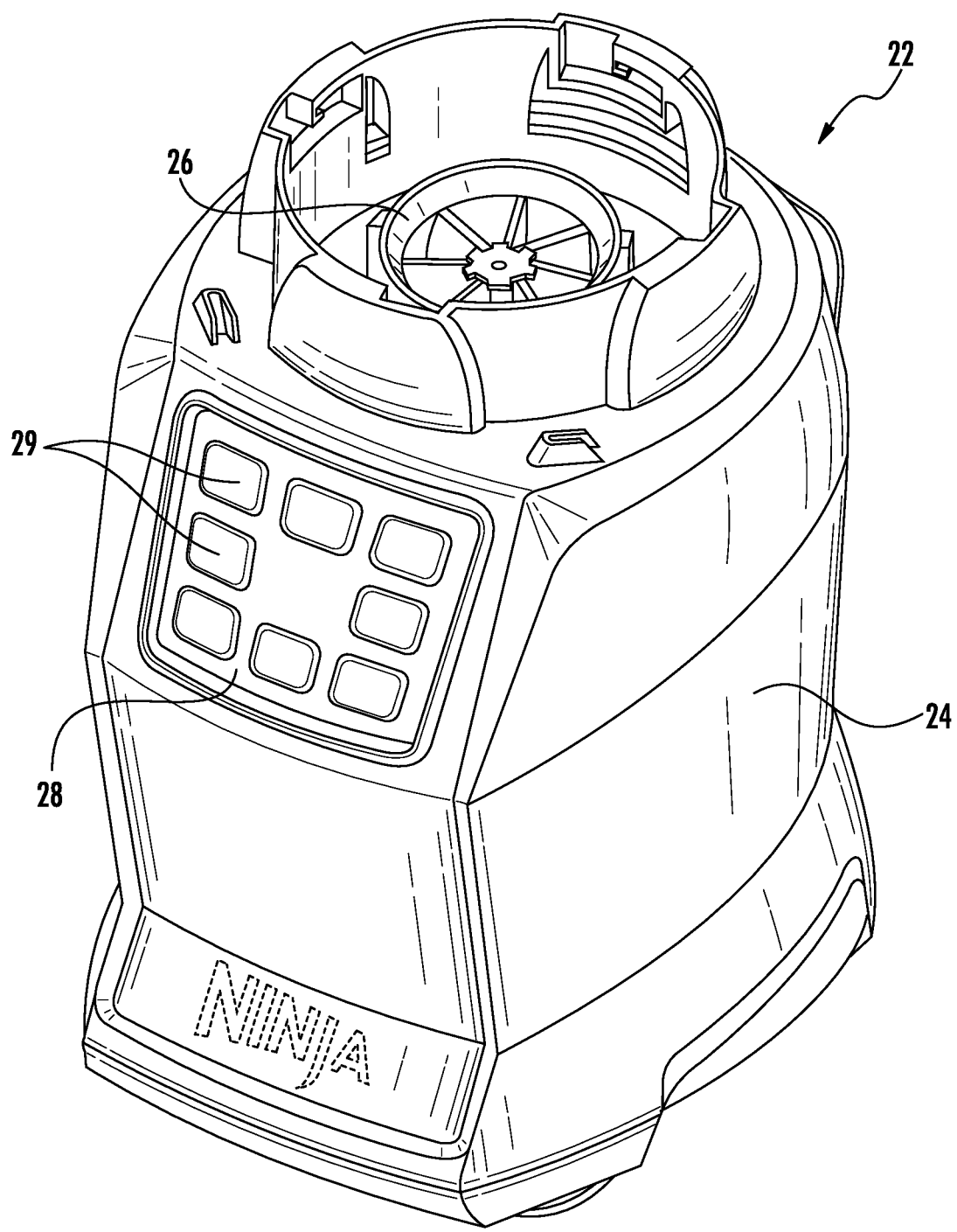
FIG. 2 is a perspective view of a base of a food processing system.
Figure 3:
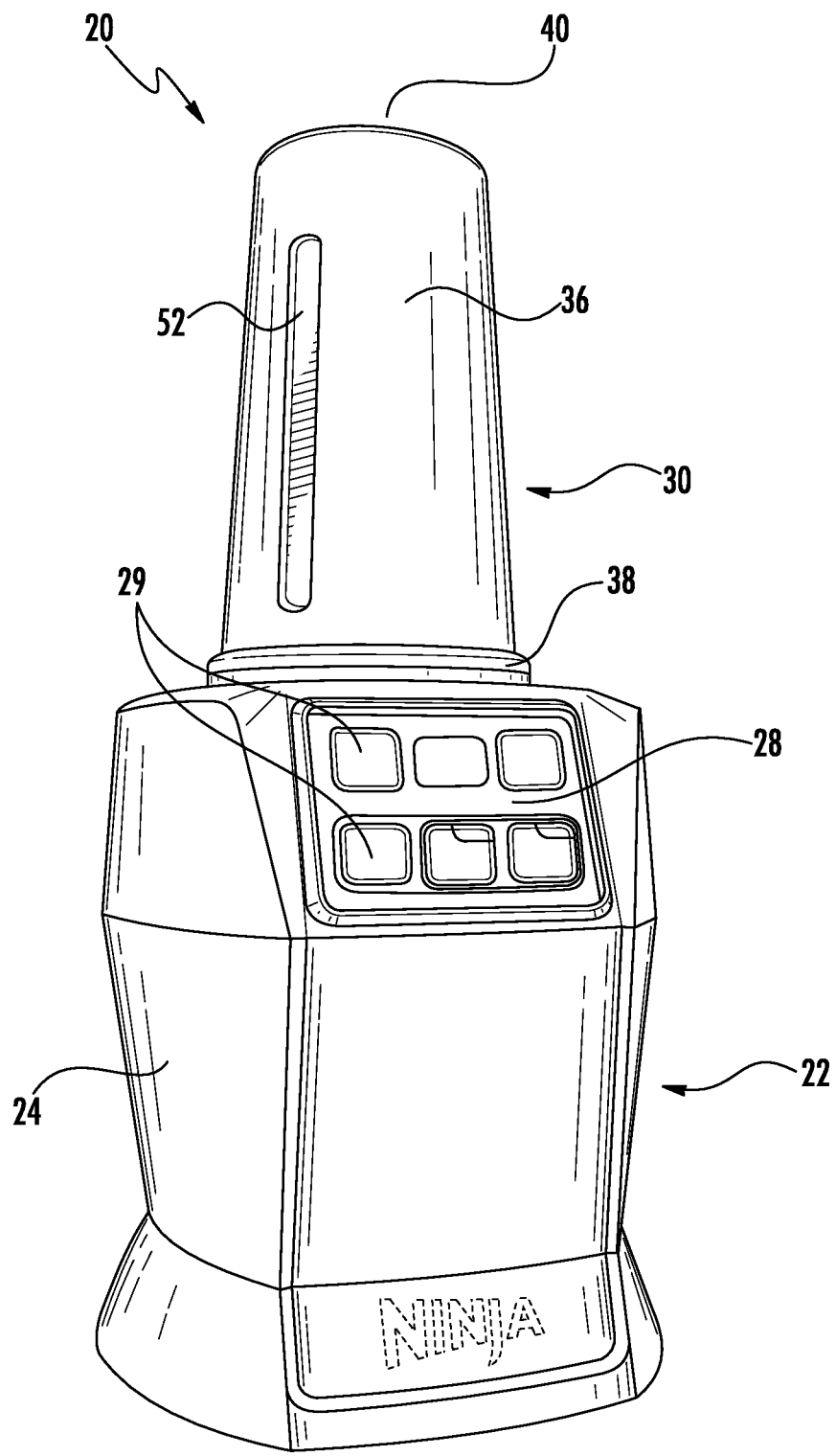
FIG. 3 is a perspective view of a food processing system according to an embodiment of the disclosure.
Figure 4:
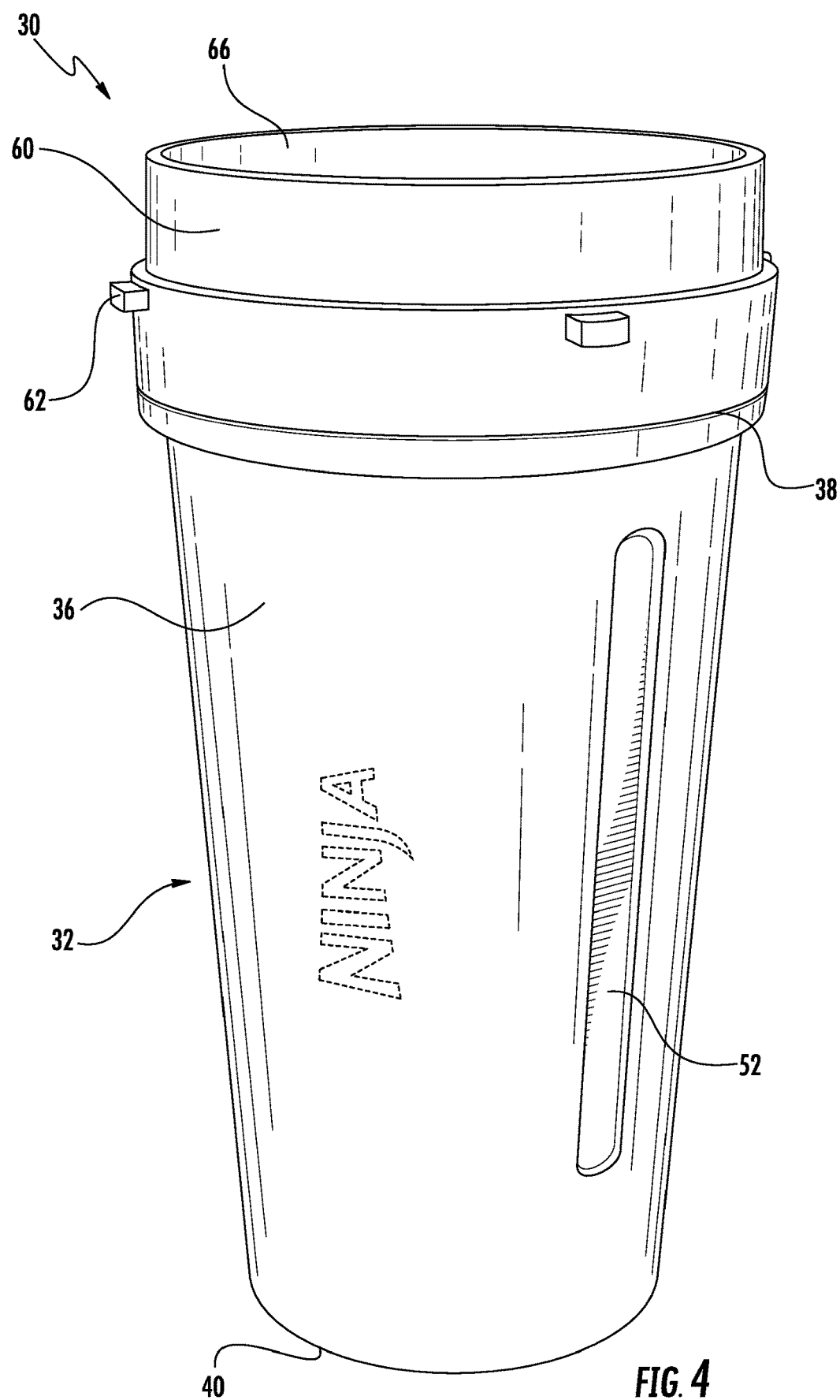
FIG. 4 is a perspective view of a container configured for use with the food processing system according to an embodiment of the disclosure.
Figure 5:
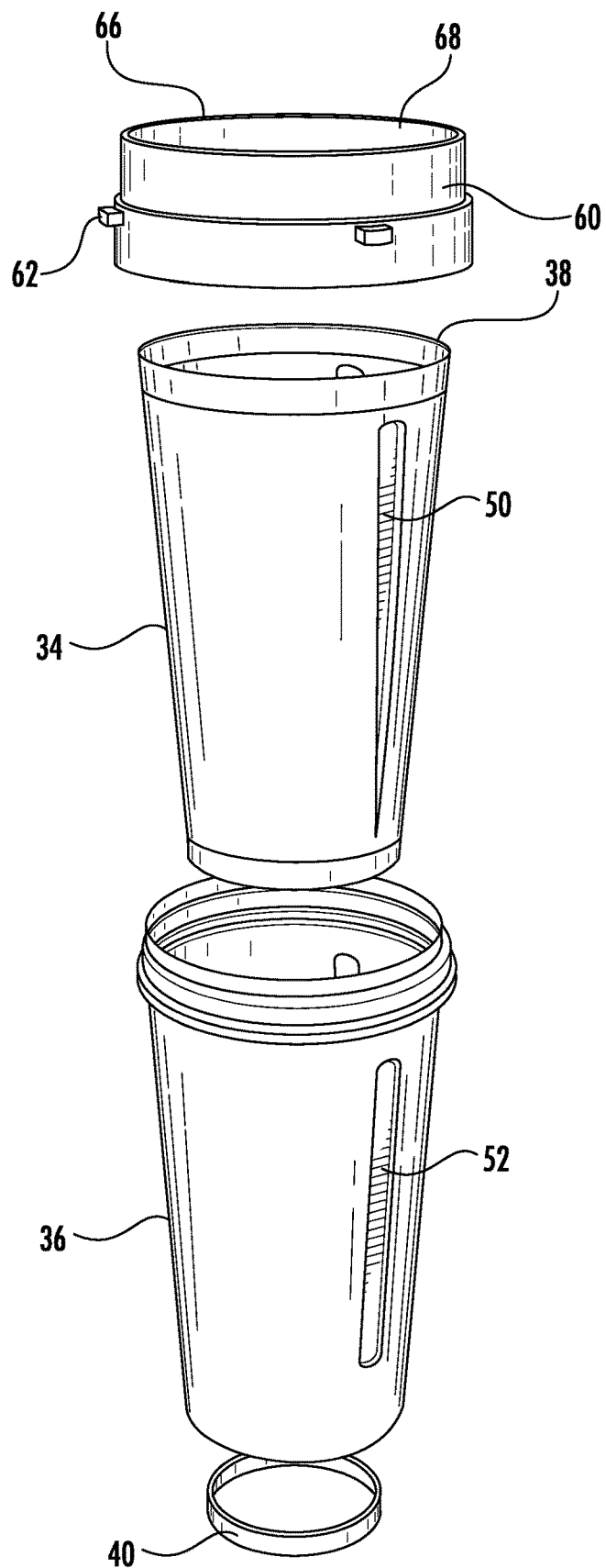
FIG. 5 is an exploded view of a container configured for use with the food processing system according to an embodiment of the disclosure.

Referring now to the FIG. 1, an example of a multi-functional food processing system 20 is illustrated in more detail. In general, the food processing system 20 can be adapted to perform any food processing or blending operation including as non-limiting examples, dicing, chopping, cutting, slicing, mixing, blending, stirring, crushing, or the like. Although the food processing system 20 illustrated and described herein is a personal blender system, other food processing systems are within the scope of the present disclosure. The food processing 20 system includes a base 22 having a body or housing 24 within which a motorized unit (not shown) and at least one controller (not shown) are located. The base 22 includes at least one rotary component, such as a drive coupler 26 (see FIG. 2) for example, driven by the motorized unit within the body 24. The base 22 additionally includes a control panel or user interface 28 with one or more input devices 29 for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

A plurality of interchangeable attachments 30 varying in size and/or functionality may be configured for use with the base 22. For example, in FIG. 1, the attachment 30 connected to the food processor base 22 is a clear plastic container. Other examples of attachments 30 configured for use with the base 22 include a grinder attachment and a spiralizer attachment for example. Another example of an attachment 30 configured for use with the food processing system 20 is illustrated in FIGS. 3-11. As shown, the apparatus is a container 30 including a body 32 having an interior wall or surface 34, an exterior wall or surface 36, and a first end 38 coupled to a portion of both the interior wall 34 and the exterior wall 36. Together the interior wall 34 and the first end 38 of the body 32 define a cavity 42 within which at least one food item to be processed is received. Generally, the second end 40 of the container 30 is closed or sealed and the first end 38 of the container 30 is open such that food products to be processed may be inserted into the cavity 42 of the container 30 via the first end 38. Although the container 30 illustrated and described herein includes a body 32 having an interior and exterior wall 34, 36, it should be understood that embodiments where the body 32 includes only a single wall are also within the scope of the disclosure.

The interior wall 34 and the exterior wall 36 may be arranged in physical contact at only one of a first end 38 and a second opposite end 40 of the body 32, such as the first end 38 at contact point 44 for example. Embodiments where the interior wall 34 and the exterior wall 36 are arranged in contact at both the first end 38 and the second end 40 are also within the scope of the present disclosure. In one embodiment, the interior wall 34 is formed from a first non-resilient material (i.e. non-plastic material) and the exterior wall 36 is formed from a second non-resilient material. The first and second non-resilient materials may be the same, or alternatively, may be different. In embodiments where the first and second non-resilient material are the same stainless steel, the interior wall 34 and the exterior wall 36 may be formed from a single sheet of stainless steel material. However, in other embodiments, at least one of the interior wall 34 and the exterior wall 36 may be formed from a plastic material or another suitable material. The contact point 44 between the interior wall 34 and the exterior wall 36 may be formed via rolling, bending, or any other suitable forming technique. For example, the interior and exterior walls 34, 36 may be formed by rolling a flat sheet into a cylinder and then welding the walls together, such as at contact point 44.

A space generally exists between the interior wall 34 and the exterior wall 36. In some embodiments, the container body 32 includes an insulating material 46 such as foam, aerogel, fiberglass or polymeric material, among others, arranged within the space, between the interior wall 34 and the exterior wall 36. In other embodiments, the space between the interior wall 34 and the exterior wall 36 may be a vacuum or filled with air. In one embodiment, an aperture 48 is formed at the second end 40 of the container 30 for introducing the insulating material 46 between the interior wall 34 and the exterior wall 36.

One or more protrusions 50 extending towards a center of the cavity 42 may be formed in the interior wall 34 of the container 30. As shown, a plurality of protrusions 50 are formed about the periphery of the interior wall 34 and extend at least partially between the first end 38 and the second end 40. The plurality of protrusions 50 may be substantially identical or may differ. Inclusion of at least one protrusion 50 on the interior wall 34 may improve the efficiency of the blending process when the container 30 is attached to a base 22 by breaking helping to break up any food products arranged within the cavity 42. More specifically, the ribs or protrusions 50 may help to disrupt the swirling of the food products, thereby facilitating the blending or break down of the food or liquid products therein.

Alternatively, or in addition, the container 30 may include one or more recesses 52 extending towards a center of the cavity 42, formed in the exterior wall 36 of the container 30. As shown, a plurality of substantially identical recesses 52 are formed about the periphery of the exterior wall 36 and extend at least partially between the first end 38 and the second end 40. However, the plurality of recesses 52 may differ. In operation, the recesses 52 may facilitate a user in holding or securing the container 30 in his or her hand by providing additional traction for fingers to engage within the recesses 52. In some embodiments, one or more of the recesses 52 and protrusions 50 are substantially aligned with one another. In other words, formation of the protrusions 50 about the interior wall 34 may lead to corresponding formation of recesses 52 about the exterior wall 36. Alternatively, the protrusions 50 and the recesses 52 need not be in substantial alignment and formation of one need not necessarily lead to the formation of the other.

Figure 6:
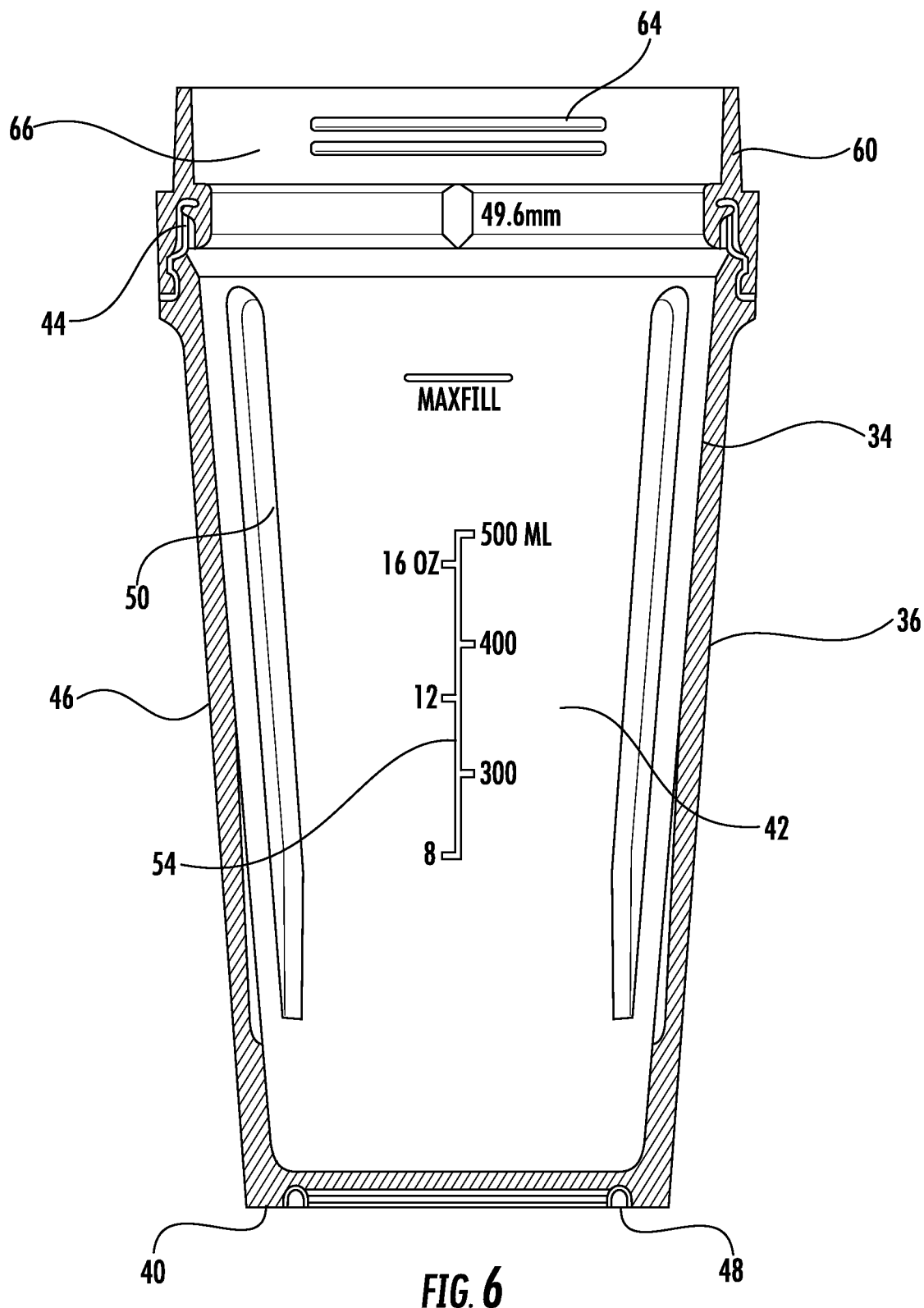
FIG. 6 is a cross-sectional view of a container configured for use with processing system according to an embodiment of the disclosure.

As shown in FIG. 6, the container 30 may include one or more markings 54, such as formed within the interior wall 34 for example. The at least one marking 54 extends at least partially between the first end 38 of the container 30 and the second, opposite end 40. The markings 54 generally include numbers, markers, or other indicators configured to help a user quantify the amount of food products or fluids within the cavity 42.

Figure 7:
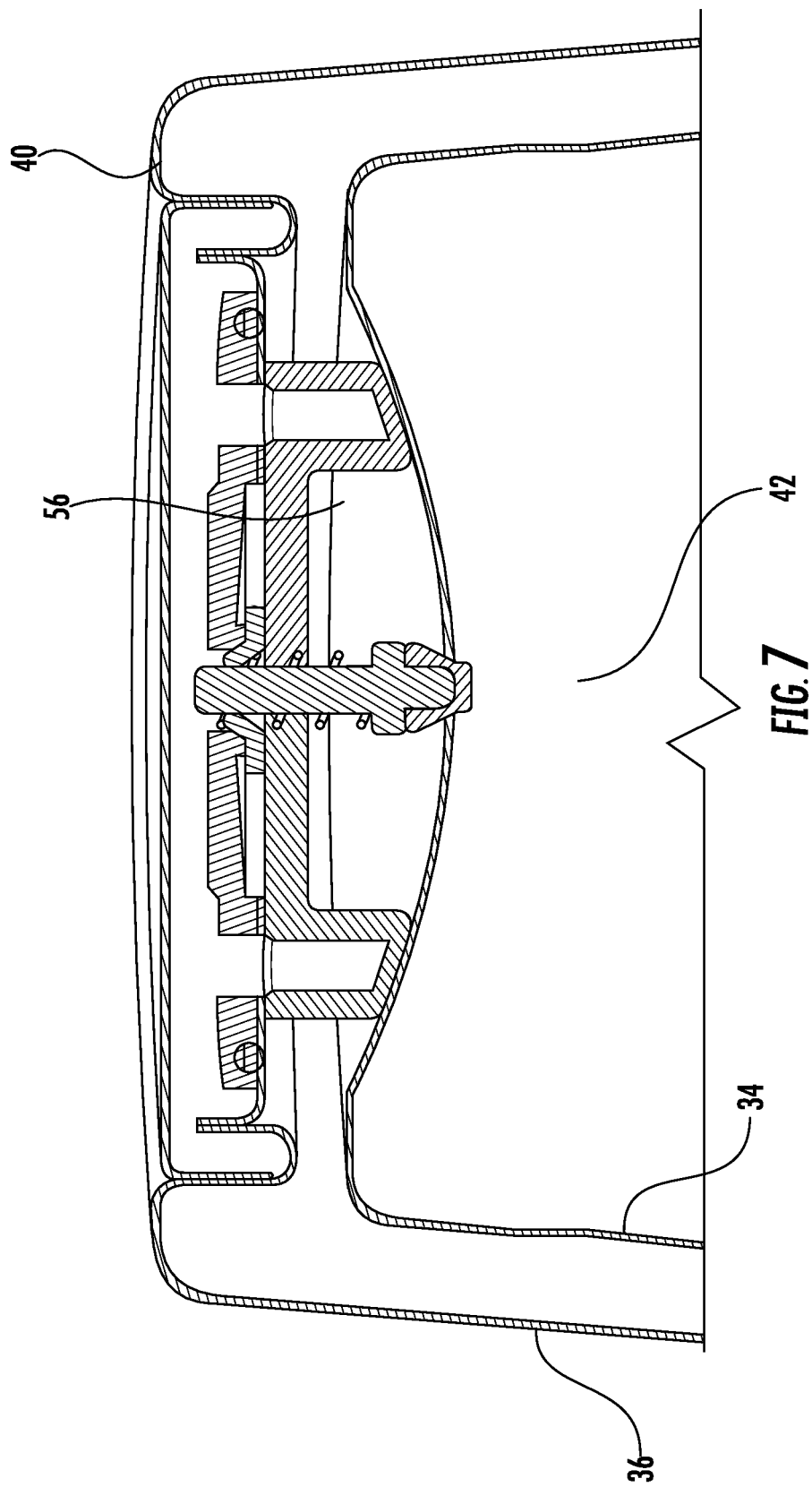
FIG. 7 is a cross-sectional view of a portion of a container configured for use with the food processing system according to an embodiment of the disclosure.

In one embodiment, the second end 40 of the container 30 includes a structure 56, such as a bubble or concaving feature (see FIG. 7). In operation, the structure 56 facilitates in the mixing or blending process by mitigating the challenges created by the angular corners of the second end 40 of the container 30. Food products may have a tendency to get stuck at the bottom of second end 40. By incorporating the structure 56, the mixing or blending process is disturbed so as to improve the processing of the food products contained within the container 30.

Figure 8:
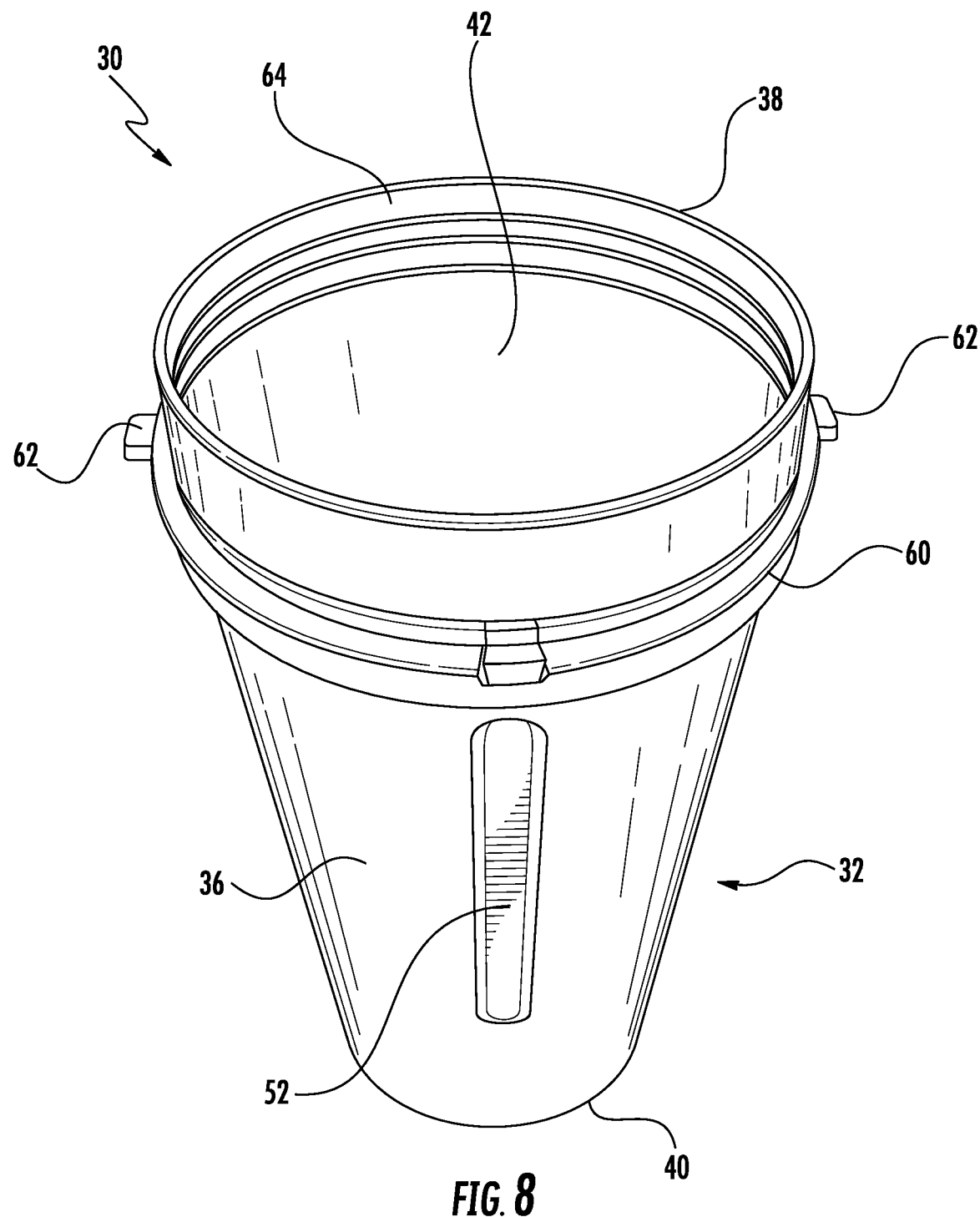
FIG. 8 is a perspective view of a container configured for use with the food processing system according to an embodiment of the disclosure.

A collar 60 is arranged adjacent the first end 38 of the container 30. In one embodiment, the collar 60 includes a plurality of outwardly extending guides or tabs 62 configured to secure the container 30 to the base 22 of the food processing system 20. In other embodiments, these tabs 62 may be integrally formed with the body 32 of the container 30. The collar 60 may be formed from a plastic material, such as a thermoplastic, polyester, or more specifically, a glycol-modified polycychlohexylenedimethylene terephthalate (PCTG) for example. In one embodiment, as illustrated in FIG. 8, the collar 60 is disposed about periphery of the exterior wall 36 of the container 30 near the first end 38, such as via a snap fit connection for example. In such embodiments, a coupling mechanism 64 configured to secure the container 30 to a cutting assembly 70, for example a plurality of threads, is formed in the interior wall 34 adjacent the first end 38. In another embodiment, illustrated in FIGS. 4-6, the collar 60 is directly coupled to the first end 38 of the container 30, such as via bonding or another suitable attachment process. In such embodiments, the may collar 60 include an annular undercut and the first end 38 of the container 30 may include a complementary annular protrusion receivable within the undercut. The collar 60 may be heated prior to being connected to the container 30 such that once coupled, the material of the collar 60 shrinks over the protrusion at the first end 38. When the collar 60 is attached directly to the end 38 of the container 30, the coupling mechanism 64 configured to secure the container 30 to a cutting assembly 70 is formed in an interior surface 66 of the collar 60 adjacent a distal end 68 thereof. The collar 60 may additionally include a plurality of protrusions similar to the protrusions 50 formed in the interior wall 34 to assist with crushing ice.

Figure 9:
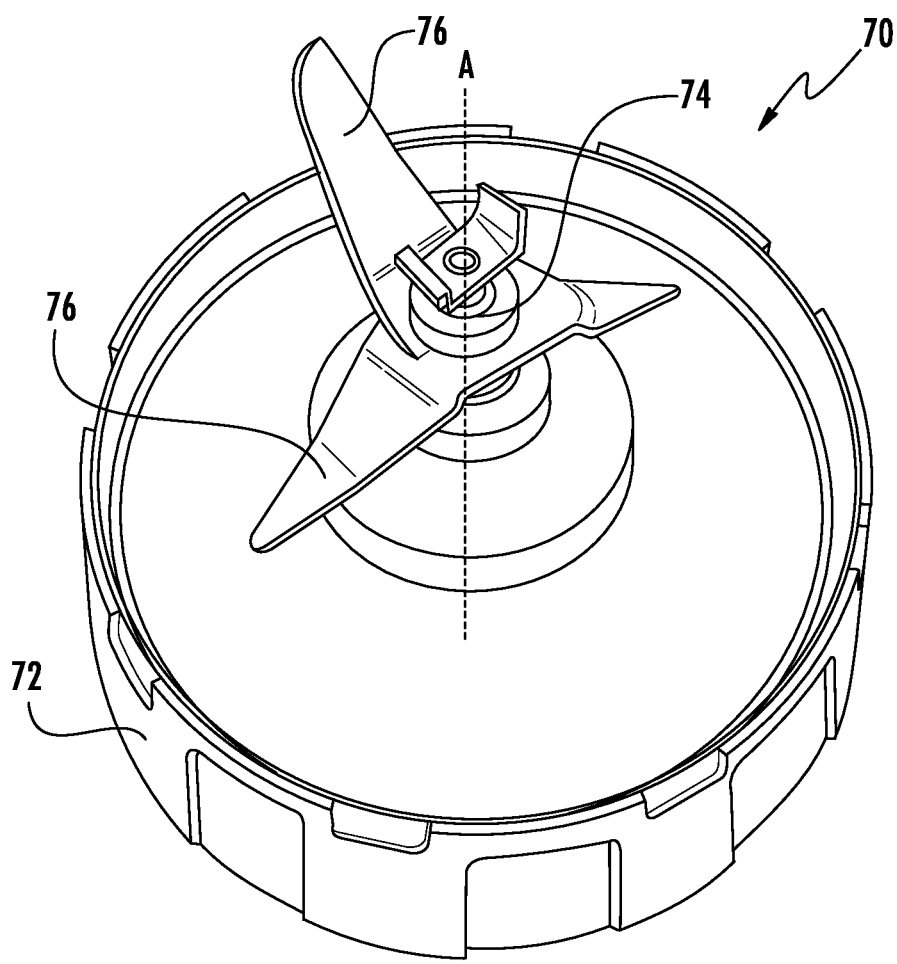
FIG. 9 is a perspective view of a cutting assembly configured for use with the container according to an embodiment of the disclosure.

An example of the cutting assembly 70 is illustrated in FIG. 9. Although the cutting assembly 70 is described herein with reference to container 30, the cutting assembly 70 may additionally be configured for use with other attachments of the food processing system 20, such as the clear plastic container shown in FIG. 1 for example. The cutting assembly 70 is configured to removably couple to the first end 38 of the container 30 or the collar 60 mounted thereto. In one embodiment, the cutting assembly 70 is generally formed from a plastic material and includes a coupling mechanism 72, such as a plurality of threads complementary to the threads 64 formed in the container 30 or collar 60. When attached, the cutting assembly 70 seals the first end 38 of the container 30 such that the food products contained within the chamber 42 are unable to escape the container 30, As shown, the rotatable cutting assembly 70 includes a spindle 74 configured to rotate about an axis A and having a blade assembly 100 mounted thereto.

Figure 10:
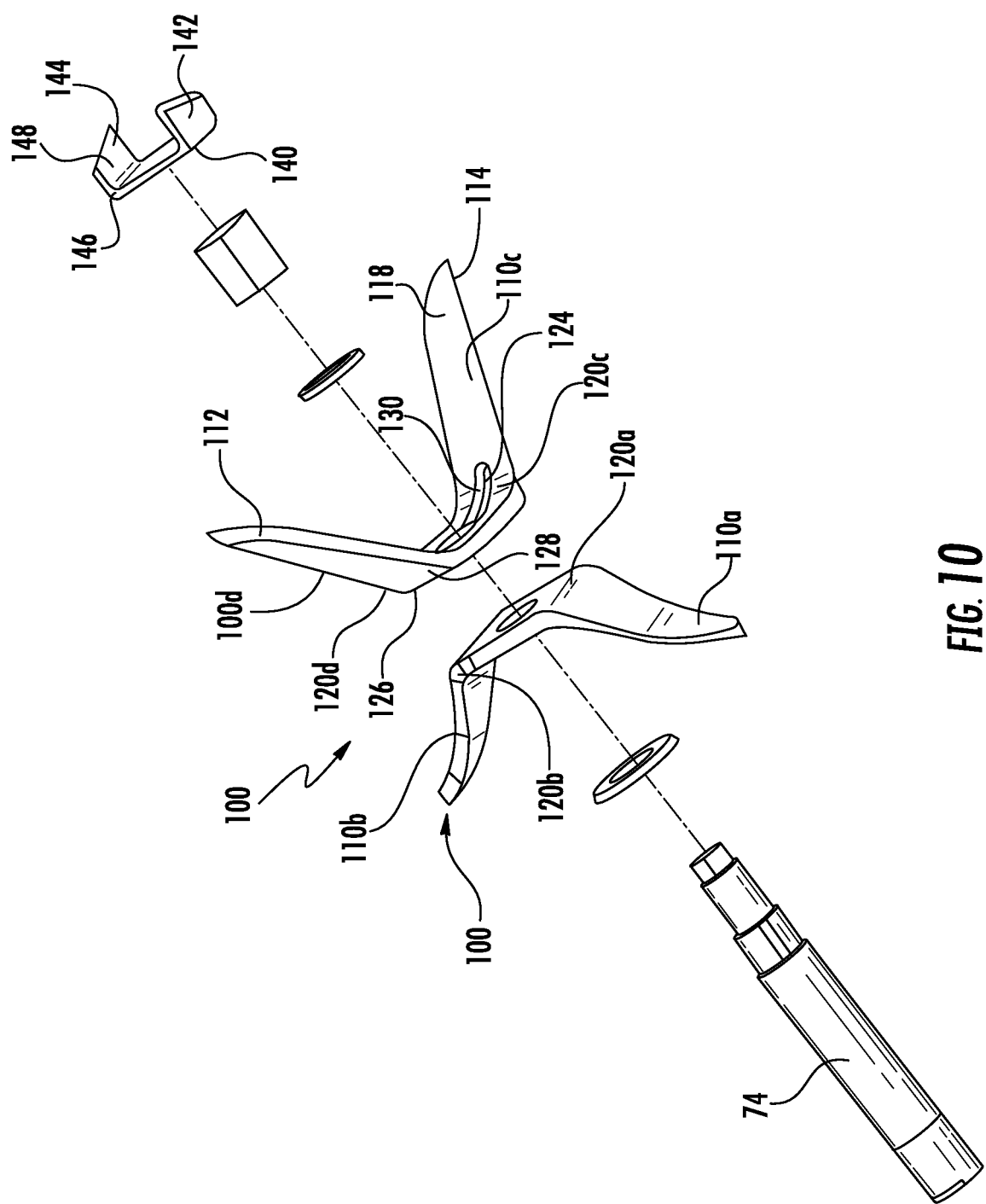
FIG. 10 is an exploded perspective view of a portion of the cutting assembly of FIG. 9.

An example of a blade assembly 100, illustrated in FIG. 10, further includes a plurality of cutting blades 110 extending radially outward at an angle from the spindle 74. Each of the cutting blades 110a-d has a sharp cutting edge 112, a blunt spine edge 114, and a cutting blade face 118 there between. In general, two or more of the cutting blades 110a-d may be included in pairs. Furthermore, one or more of the cutting blades 110a-d generally can extend both radially outward from the spindle 74 and longitudinally upward or longitudinally downward along the spindle 74. For example, in accordance with the embodiment of FIG. 4, the cutting blades 110a-d can include a first pair of opposing cutting blades 110a, 110b extending radially outward from the spindle 74 and longitudinally downward along the spindle 74, as well as a second pair of opposing cutting blades 110c, 110d extending radially outward from the spindle 74 and longitudinally upward along the spindle 74. The first pair of opposing cutting blades 110a, 110b are "opposing" in that they are disposed around the spindle 74 separated by an angular displacement of about 180 degrees. The second pair of opposing cutting blades 110c, 110d likewise are "opposing" in that they are disposed around the spindle 74 separated by an angular displacement of about 180 degrees. As depicted, the first pair of opposing cutting blades 110a, 110b and the second pair of opposing cutting blades 110c, 110d are disposed around the spindle 74 separated from each other by an angular displacement of about 90 degrees.

Although four cutting blades 110a-d are depicted in the exemplary embodiment of FIG. 10, it should be appreciated that any other number of cutting blades 110a-d (e.g., one, two, three, five, six, etc.) alternatively can be included in the blade assembly 100. Furthermore, although the cutting blades 110a-d are generally separated by about 90 degree increments in the illustrated, non-limiting embodiment, it should be appreciated that the cutting blades 110a-d alternatively can be separated by any other suitable amount(s), which may be a uniform or variable amount among the plurality of cutting blades 110a-d.

In addition to the cutting blades 110a-d, the blade assembly 100 further includes a plurality of transition sections 120 located between the spindle 74 and the plurality of cutting blades 110. Each of the transition sections 120a-d define the angle at which each of the cutting blades 110 extend longitudinally downward (in the case of blades 110a, 110b) or longitudinally upward (in the case of blades 110c, 110d). In other words, the bends in the blade assembly 100 forming the angles of each of the cutting blades 110a-d exists in the transition sections 120a-d.

A gusset 130, as described above, is integrally formed on at least one of the plurality of transition sections 120. The gusset 130 forms a raised portion 124 on the top surface 122 and a cavity 126 on the bottom surface 128. Although one gusset 130 is depicted in the embodiment of FIG. 10, it should be appreciated that any other number of gussets 130 (e.g., one, two, three, four, etc.) alternatively can be included in the blade assembly 100. While the gusset 130 is shown as being integrally formed on the upper pair of cutting blades 110c, 110d, one or more gussets could also be likewise formed on the lower pair of cutting blades 110a, 110b.

In addition to the cutting blades 110a-d and the transition sections 120a-d, the blade assembly 100 can include at least one crushing blade 140 extending longitudinally outwardly from the spindle 74 (e.g., vertically upward, as oriented in FIG. 10). Each crushing blade 142 has a first edge 144, a second edge 146, and a crushing blade face 148 there between. In the embodiment of FIG. 10, two crushing blades 142 are disposed around the spindle 74 separated by an angular displacement of about 180 degrees. The two crushing blades 142 are substantially parallel to each other, as depicted. The crushing blade face 148 of each crushing blade 142 can be substantially flat and each can have a top edge that is sloped (e.g., by 45 degrees, or any other amount) relative to a plane containing a direction of rotation of the blade assembly 100. It should be noted that the first edge 144 and second edge 146 represent smaller dimensions of the blade, while the crushing blade face 148 is a relatively substantially greater dimension, as would be interpreted in accordance with the customary labels for these parts of a knife blade or similar structure. In one embodiment, the rotational speed of the spindle 74 is between about 12,000 rpm and about 22,000 rpm.

Figure 11:
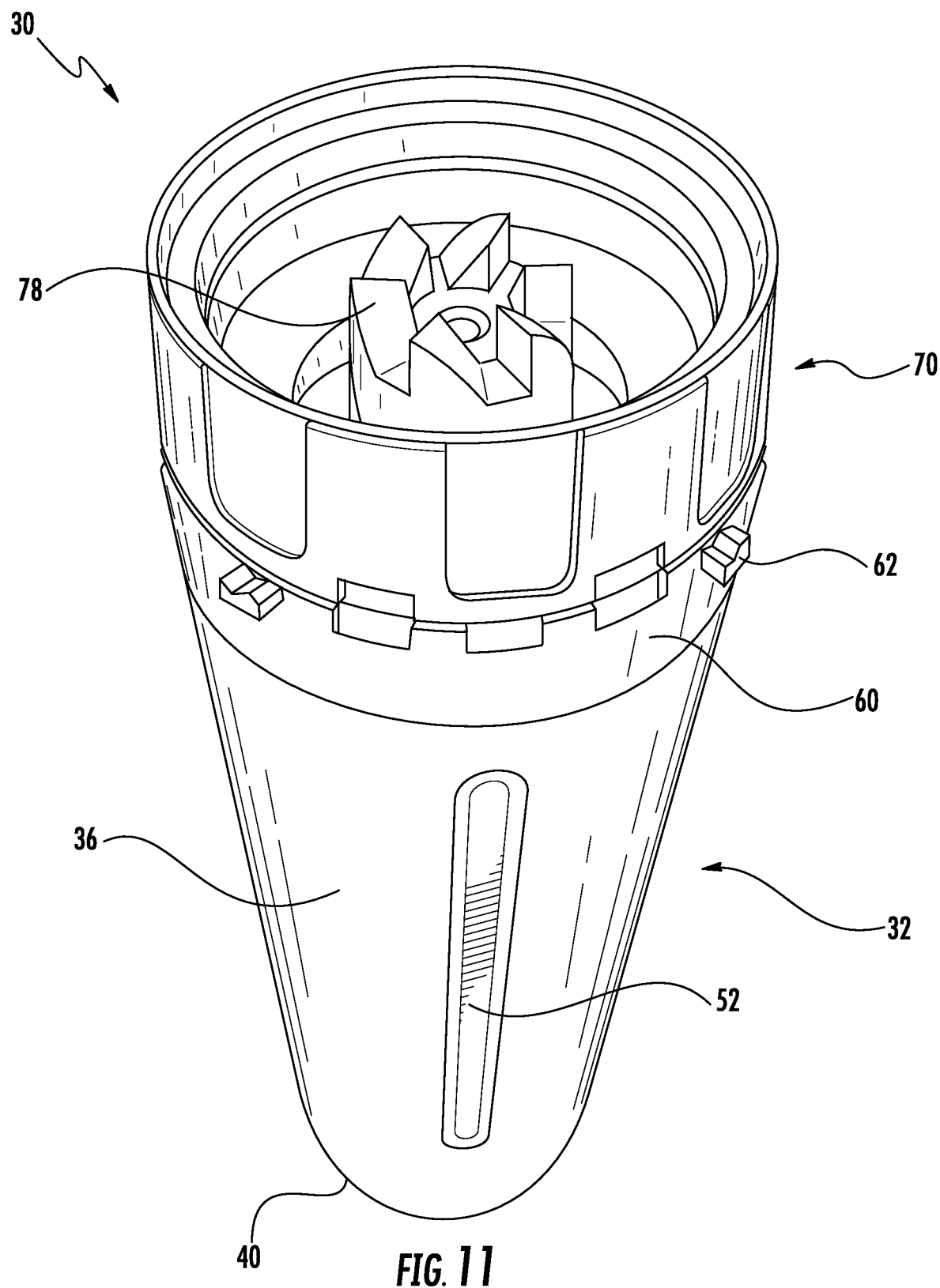
FIG. 11 is a perspective view of a coupled cutting assembly and container configured for use with the food processing system according to an embodiment of the disclosure.
Figure 12:
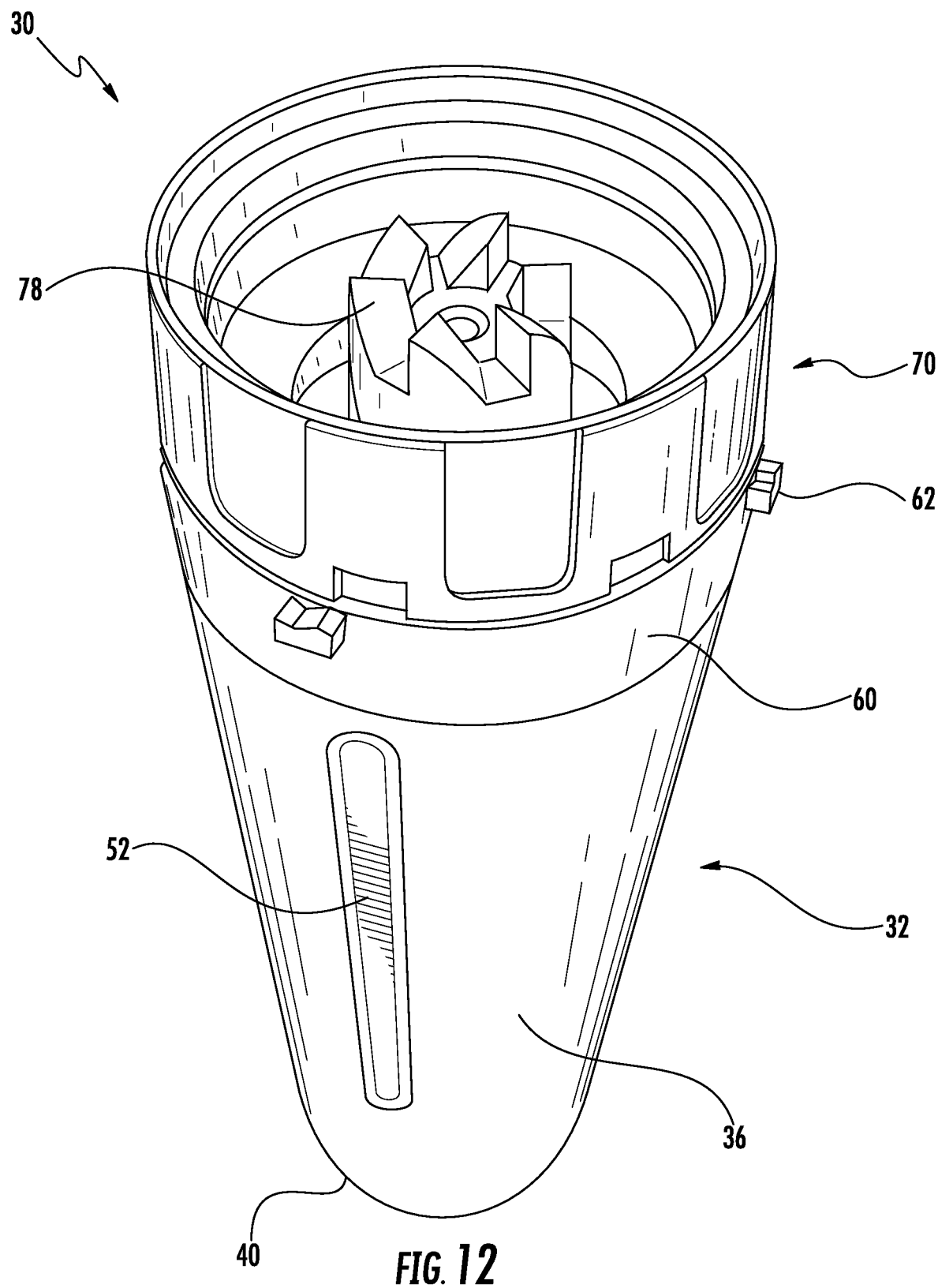
FIG. 12 is a perspective view of another coupled cutting assembly and container configured for use with the food processing system according to an embodiment of the disclosure.

Referring now to FIGS. 11 and 12, the cutting assembly 70 includes a coupling 78, complementary to the at least one drive coupler 26 of the base 22, disposed at the underside of the cutting assembly 70. When coupled to the container 30, the at least one blade 76 is disposed within the chamber 42 such that rotation thereof is adapted to facilitate processing and/or blending of the food products arranged therein. Once the cutting assembly 70 is secured to the container 30, the container 30 may be connected to the base 22 of the food processing system 10.

The container 30, and possibly any of the other attachment configured for use with the base 22, may be configured to slidably connect thereto. Alternatively or in addition, the attachment 30 may be configured to rotatably connect to the base 22 such that the attachment 30 is locked relative to the base 22. In one embodiment, the plurality of tabs 62 extending from the collar 60 are configured to align with a plurality of complementary openings (see FIG. 2) formed in the base 22. Rotation of the attachment 30 causes the tabs 62 to engage adjacent channels, thereby preventing unintended separation of the attachment 30 from the base 22 during operation of the food processing system 20.

When the container 30 is mounted to the base 22, at least a portion of the cutting assembly 62 is received within the base 22. The coupling 78 of the cutting assembly 70 is positioned adjacent to and in contact with the at least one drive coupler 26 of the base 22 such that the motorized unit and the cutting assembly 70 within the container 30 are mechanically coupled. As a result, the motorized unit can be adapted to drive rotation of the cutting assembly 70 about axis A to perform one or more food processing and/or blending operations when one or more buttons 29 of the user interface 28 on the base 22 are actuated.

Figure 13:
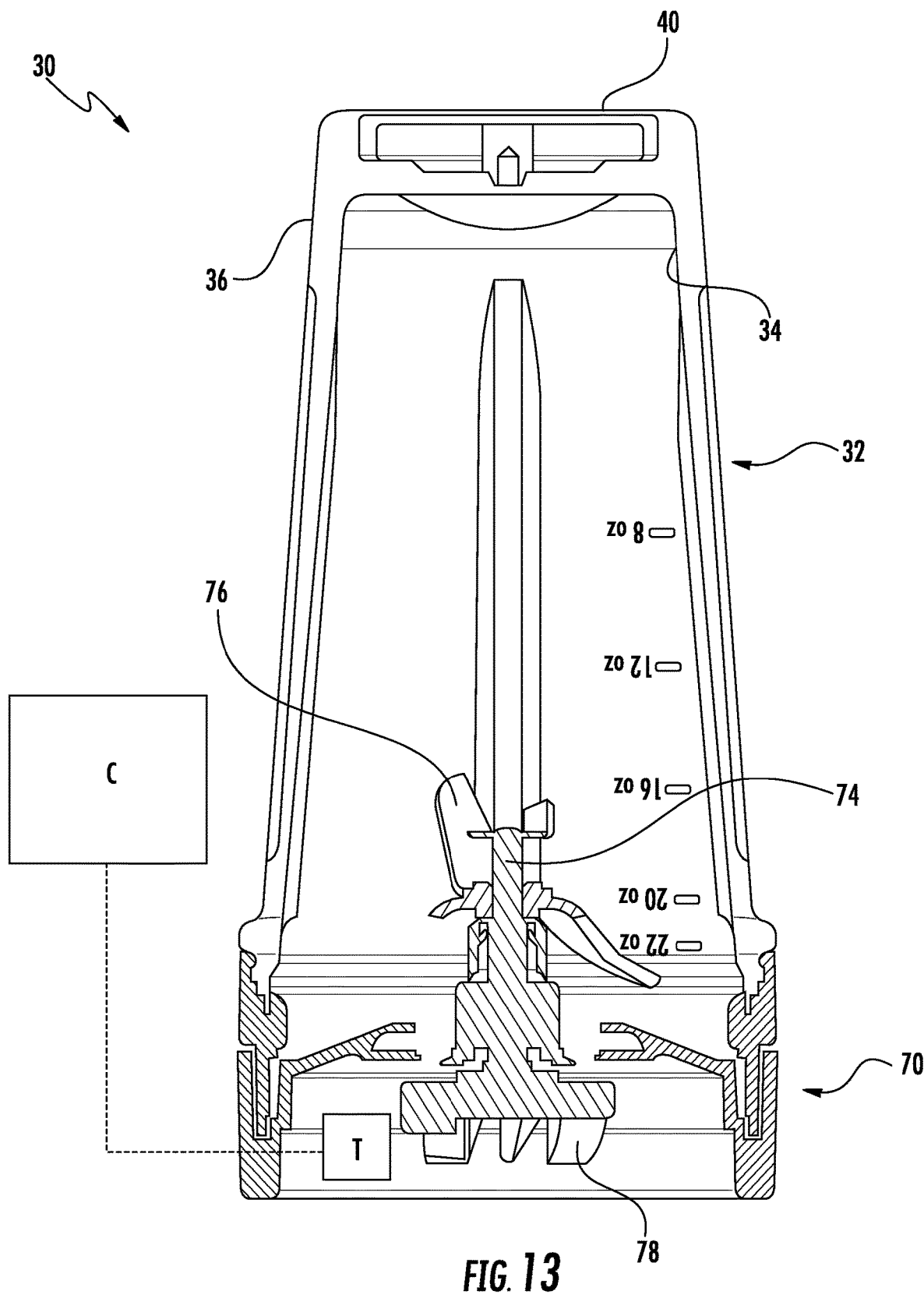
FIG. 13 is a cross-sectional view of a pressure relief system of the food processing system according to an embodiment of the disclosure.

During operation of the food processing system 20, rotation of the cutting assembly 70 increases the pressure and heat within the chamber 42 of the container 30. In one embodiment, the temperature within the chamber 42 may exceed 80° C. In the event of excessive heat and pressure build up within the container 30, damage to the container 30 and/or the cutting assembly 70 may occur. In one embodiment, the container 30 includes a pressure relief system configured to prevent pressure within the cavity or chamber 42 from exceeding a predetermined threshold, such as between about 2-7 psi for example. To prevent the heat and/or pressure within the chamber 42 from exceeding the threshold, the system 20 may include a timing mechanism T operably coupled to the motorized unit via a controller C (see FIG. 13). The threshold is associated with a predetermined length of time. In one embodiment, the timing mechanism is configured to monitor a length of time that the attachment 30 is coupled to the base 24. In such embodiments, the timing mechanism may be reset once the attachment 30 is separated from the base 24. In another embodiment, the timing mechanism is configured to monitor a length of time that the motorized unit configured to drive rotation of the cutting assembly about an axis X is operational. In such embodiments, the timing mechanism may be reset once the motorized unit comes to a complete stop and/or remains stopped for a set period of time. In embodiments where the period of time monitored by the timing mechanism exceeds the predetermined length of time, power may be removed from the motorized unit. In addition, the system 20 may require that certain conditions be satisfied prior to restarting operation, such as unplugging the system 20 from a power source for example. Although the timing mechanism T is illustrated in conjunction with an attachment having an interior wall 34 and an exterior wall 36, the timing mechanism T may be used on any attachment 30 configured for use with the food processing system 20.

Figure 14:
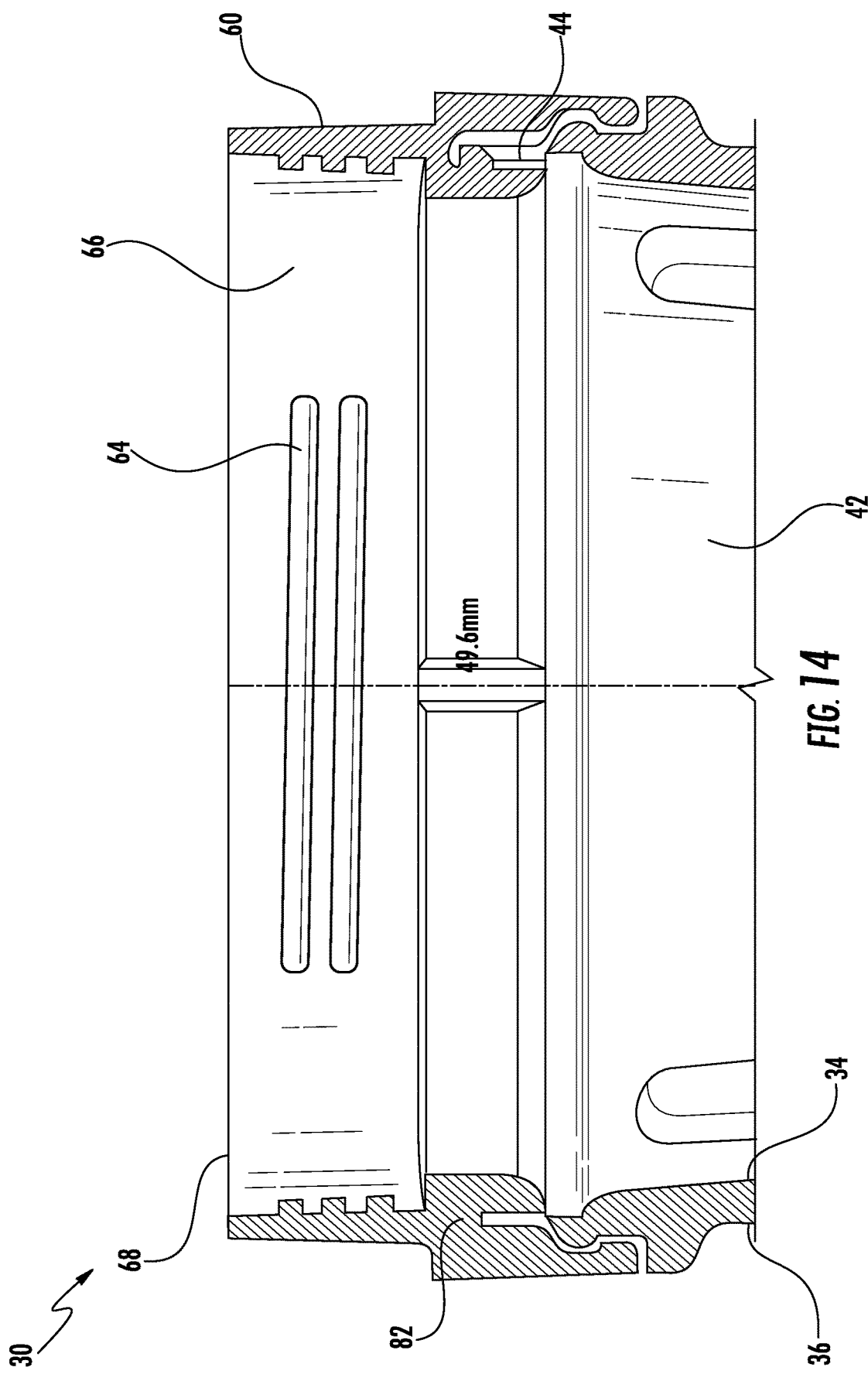
FIG. 14 is a cross-sectional view of another pressure relief system of a container configured for use with the food processing system according to an embodiment of the disclosure.

Alternatively, or in addition, the pressure relief system may include venting air from within the cavity 42 to outside the container 30 to reduce pressure. In one embodiment, the coefficient of thermal expansion is different between the interior and exterior walls 34, 36 of the container 30 and the collar 60. As a result, during operation of the food processing system 20, the collar 60 and container 30 may partially separate to generate a small fluid flow path through which air from within the cavity 42 may escape. Alternatively or in addition, the pressure relief system includes a pressure relief mechanism 80 configured to deform when the pressure within the cavity 42 exceeds a threshold. In some embodiments, deformation of the pressure relief mechanism 80 is elastic. For example, a seal 82 arranged between the container 30 and the collar 60 (FIG. 14) may be configured to compress and create a fluid path when the pressure within the cavity 42 exceeds a threshold.

Figure 15:
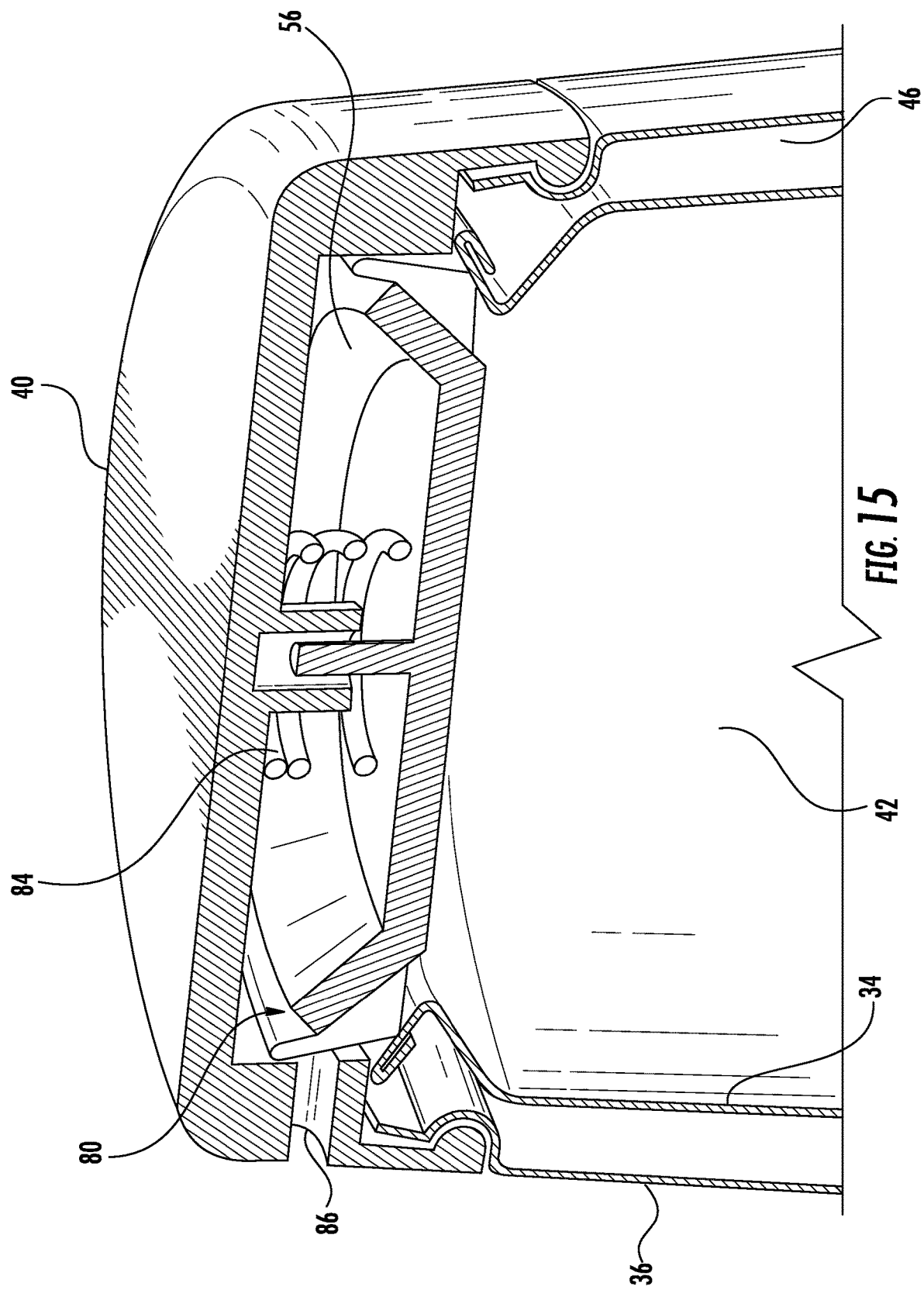
FIG. 15 is a perspective cross-sectional view of a pressure relief mechanism of a container configured for use with the food processing system according to an embodiment of the disclosure.

In another embodiment, as shown in FIG. 15, a portion of the container 30, such as structure 56 for example, may be formed as a pressure relief mechanism 80 via inclusion of a biasing mechanism 84. When the pressure within the cavity 42 exceeds a threshold, the force acting on the structure 56 causes the biasing mechanism 84 to compress, thereby increasing the volume of the chamber 42 and reducing the pressure therein. In the illustrated, non-limiting embodiment, deformation of the pressure relief mechanism 80 is also configured to fluidly couple an opening 86 to the chamber 42, allowing air from within the cavity 42 to vent outside the container 30. Once the pressure within the container 30 drops to below the threshold, such as via opening 86 or by removing the cutting assembly 70, the biasing force of the biasing mechanism 84 will return the structure 56 to its original position. Although the pressure relief mechanism 80 is illustrated and described as being positioned adjacent the second end 40 of the container 30, another mechanism 80 arranged at any location is within the scope of the present disclosure. However, by positioning the mechanism 80 adjacent the second end 40 of the container 30, only air and not the food being processed within the container 30 may be vented through opening 86.

Figure 16:
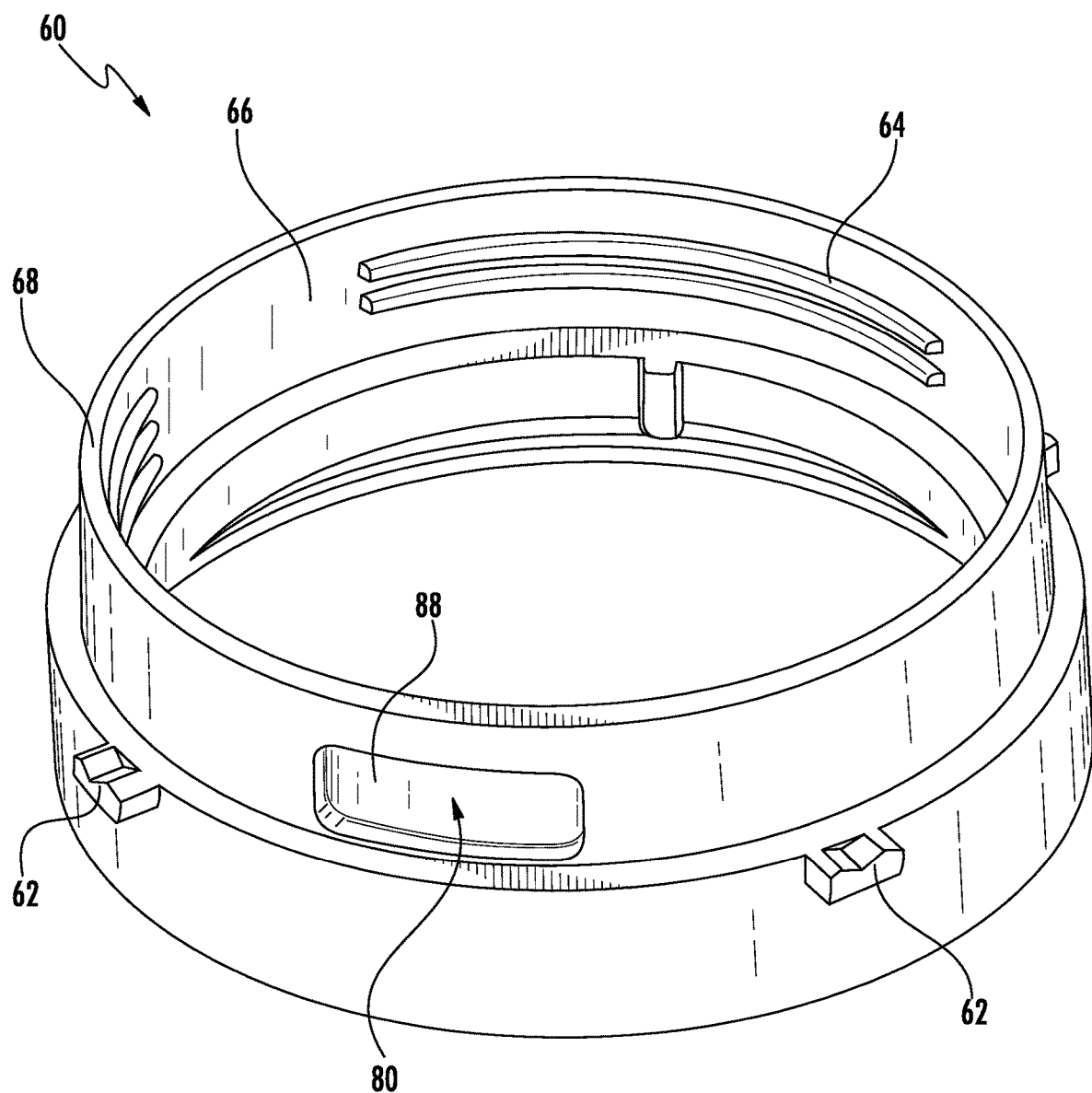
FIG. 16 is a perspective view of another pressure relief mechanism of a container configured for use with the food processing system according to an embodiment of the disclosure.
Figure 17:
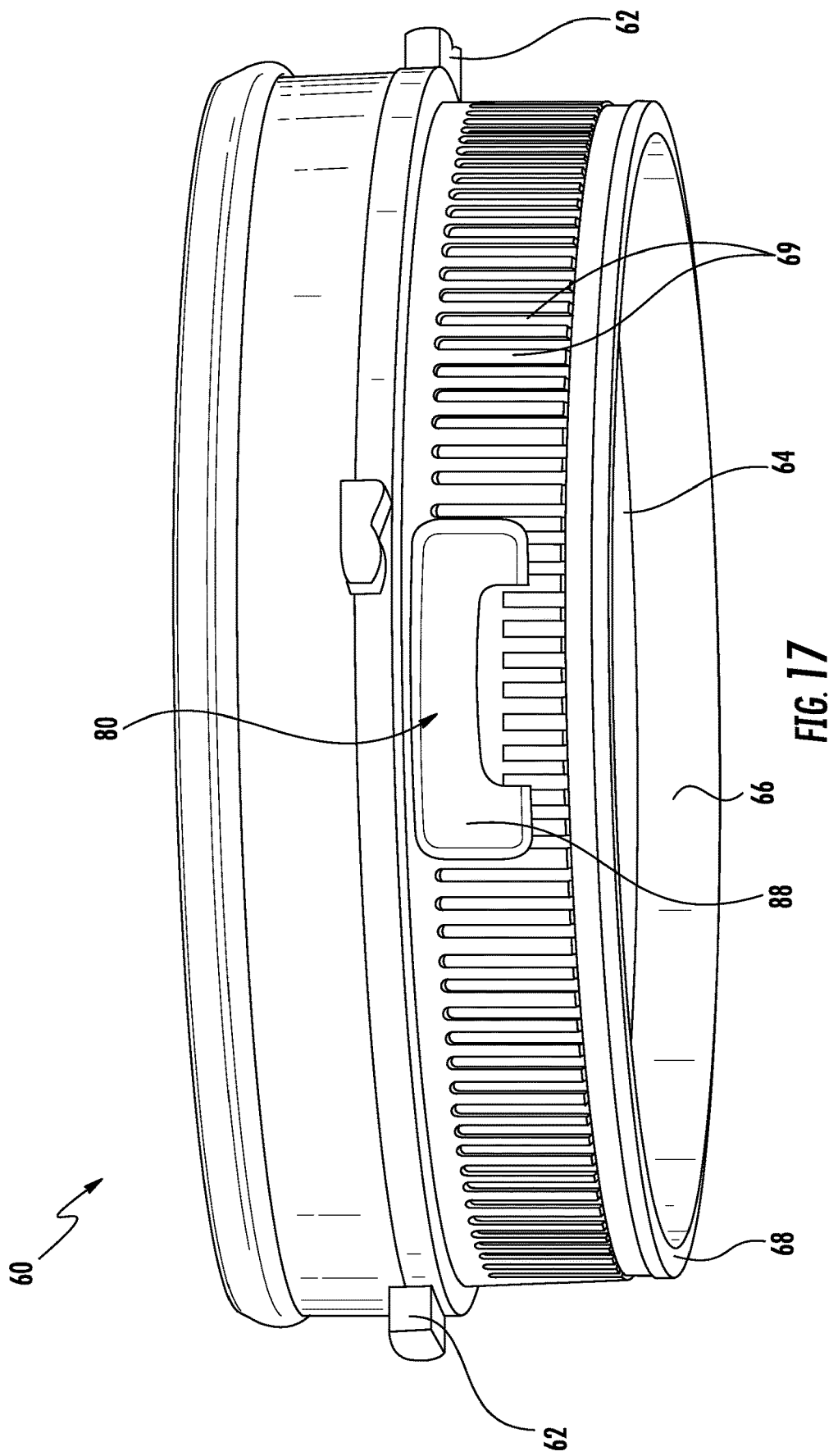
FIG. 17 is a perspective view of another pressure relief mechanism of a container configured for use with the food processing system according to an embodiment of the disclosure.

With reference now to FIGS. 16 and 17, the pressure relief mechanism 80 may alternatively be configured to plastically deform when the pressure within cavity 42 exceeds a threshold. In one embodiment, the pressure relief mechanism 80 includes one or more areas 88 having a reduced wall thickness relative to the remainder of the container 30 and/or collar 60. For example, as shown in FIG. 16, an area 88 having a reduced wall thickness may be formed in the portion of the collar 60 configured to overlap with the cutting assembly 70. Due to the excessive heat within the cavity 42, the thin walled areas 88 tend to soften. In combination with the heat, when the pressure within the cavity 42 exceeds the threshold, the pressure relief mechanism 80, specifically the softened area 88 will deform, such as by protruding outwardly. Although the entire area 88 is illustrated as having a reduced wall thickness, embodiments where only a perimeter of the area 88 has a reduced wall thickness is also within the scope of the disclosure. In one embodiment, the portion of the collar 60 including the one or more areas 88 having a reduced wall thickness additionally includes a plurality of corrugations formed about the periphery thereof (FIG. 17). The corrugations 89 are configured to prevent the formation of a secondary seal between the collar 60 and the cutting assembly 70 when the one or more areas 88 deform.

Figure 18:
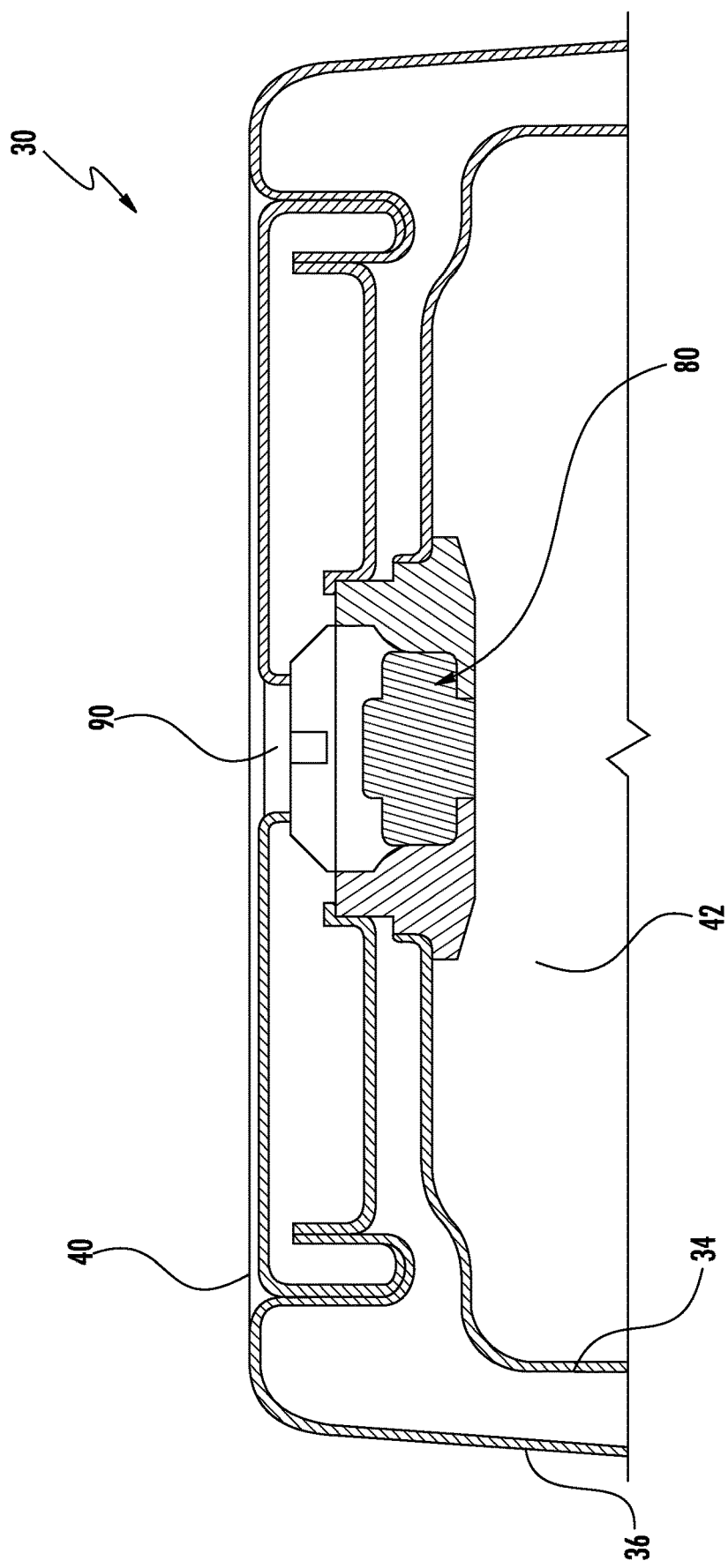
FIG. 18 is a cross-sectional view of yet another pressure relief mechanism of a container configured for use with the food processing system according to an embodiment of the disclosure.

In another embodiment, a pressure relief mechanism 80 is formed as a seal adjacent an opening 90 in the container 30, the collar 60, and/or the cutting assembly 70. With reference to FIG. 18, when the pressure within the cavity 42 exceeds the threshold, the pressure relief mechanism 80 is forced through the opening 90 and may separate from the container 30. In some embodiments, the plastic deformation of the pressure relief mechanism 80 may be configured to prevent future use of the container 30 and/or collar 60 with the food processing system 20. Alternatively, as shown in FIGS. 19 and 20, the pressure relief mechanism 80 may include a sealing member 91, such as a ball for example, coupled to a biasing mechanism 84 and arranged adjacent an opening 90. In one embodiment, the pressure relief mechanism 80 is disposed within the spindle 74 of the cutting assembly 70. During normal operation of the system 20, the sealing member 91 seals a fluid flow path through opening 90. However, when the pressure within the cavity 42 exceeds the threshold, the pressure applies a force on the ball 91, thereby compressing, or alternatively, extending the biasing mechanism. As a result of the pressure, the sealing member 91 moves out of a sealing position to allow a fluid flow through the opening 90, thereby releasing pressure from within the cavity 42.

Figure 21:
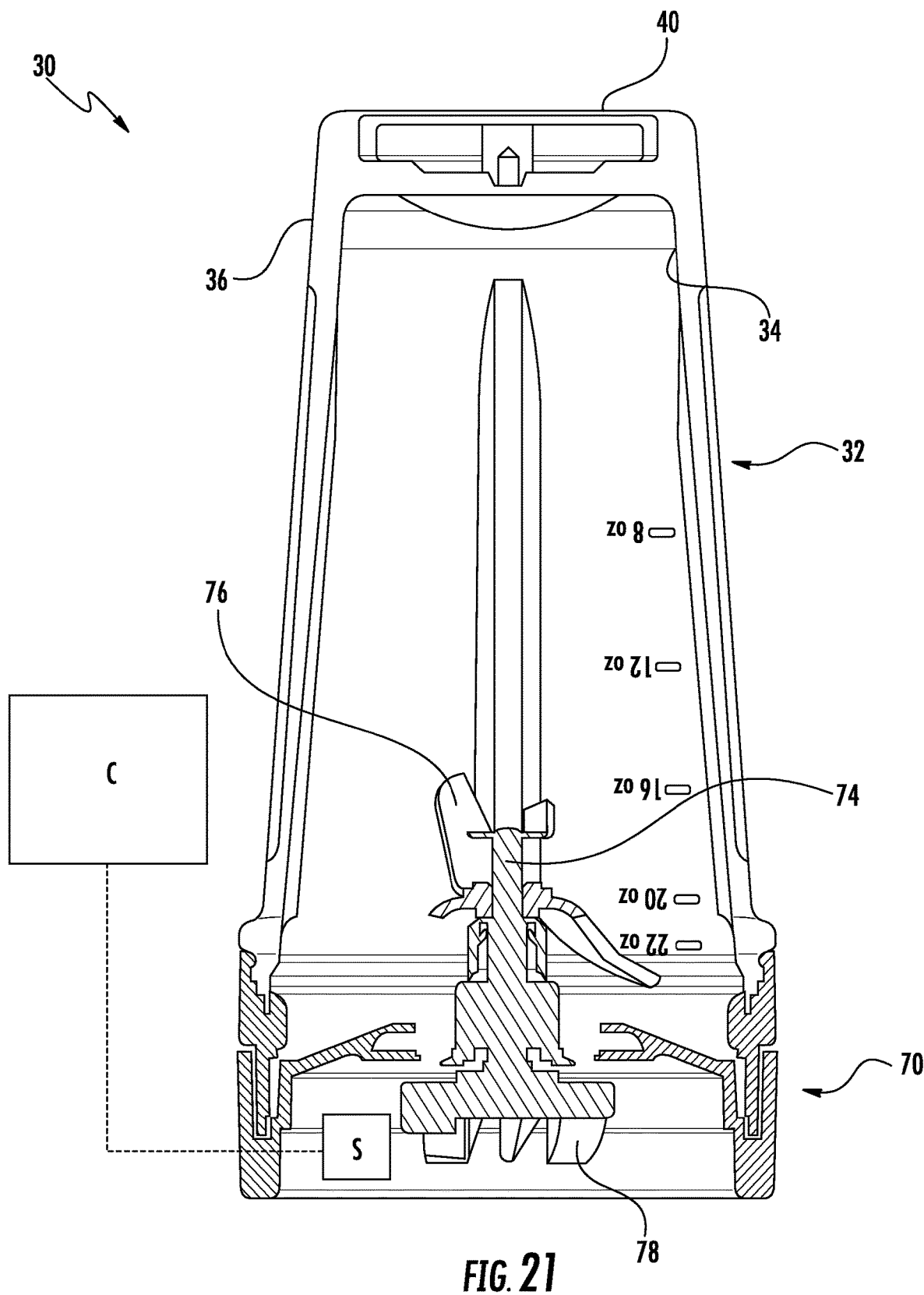
FIG. 21 is a cross-sectional view of a pressure relief system of the food processing system according to an embodiment of the disclosure.
Figure 22:
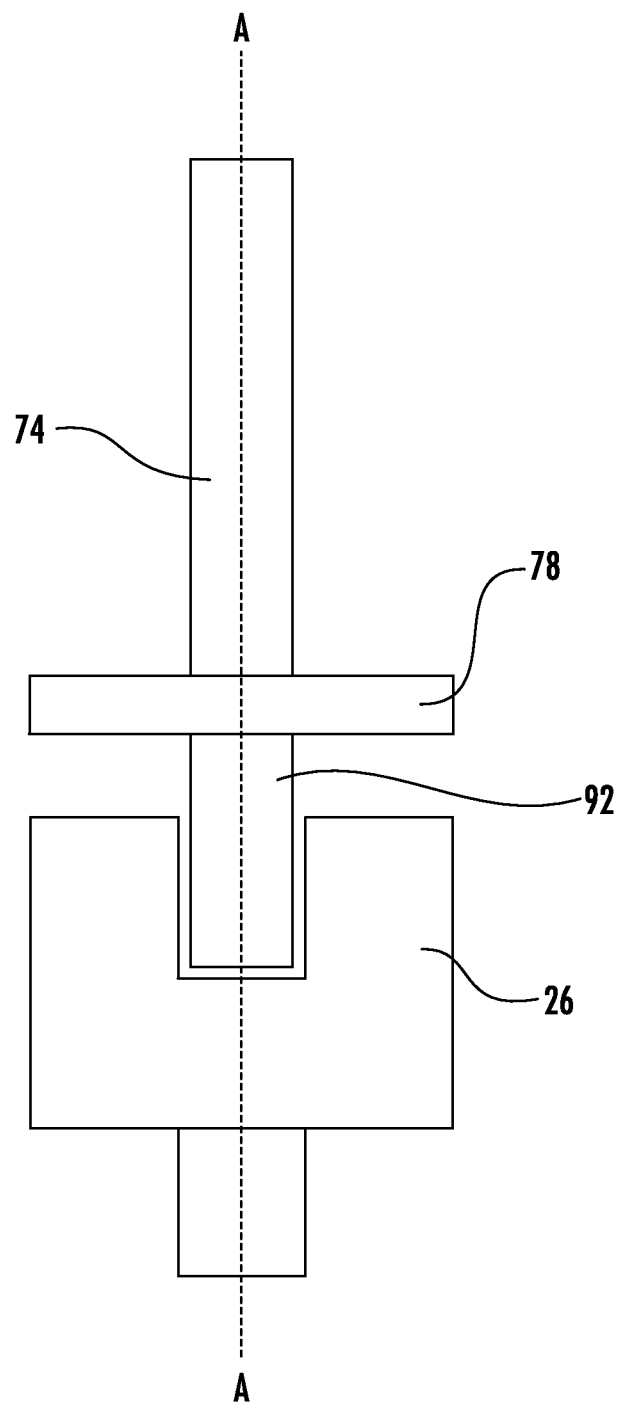
FIG. 22 is a cross-sectional view of another pressure relief system of the food processing system according to an embodiment of the disclosure.

In yet another embodiment, the food processing system 20 is configured to sense when the pressure within the cavity 42 exceeds a predetermined threshold and stop operation thereof. For example, as illustrated in FIG. 21, the system 20 may include a sensor, illustrated schematically at S, configured to monitor at least one parameter of a portion of the system 20, for example the shaft of the cutting assembly 70. Upon detection that the parameter has passed a predetermined threshold indicative of excessive pressure, a controller C operably coupled to the sensor S removes power from the motorized unit within the base 22, and therefore from the drive coupler 26. Alternatively, the connection between the drive coupler 26 and the coupling 78 of the cutting assembly 70 may be interrupted when the pressure within the cavity 42 exceeds a threshold. As illustrated in FIG. 22, the coupling 78 of the cutting assembly 70 and the drive coupler 26 are indirectly coupled via a connection member 92. In one embodiment, the connection member 92 may be formed from a heat sensitive material. When the pressure within the chamber 42 exceeds the threshold, the elevated temperate will cause the connection member 92 to melt, thereby decoupling the cutting assembly 70 and the drive coupler 26. In another embodiment, the heat sensitive material may be configured to expand, thereby preventing rotation of the drive coupler 26 about the axis A. Alternatively, the connection member 92 is a clutch configured to selectively disengage from one of the coupling 78 and the drive coupler 26 in response to excessive pressure.

Inclusion of a pressure relief system in container 30 allows the container 30 to be manufactured from a greater variety of materials including non-resilient materials such as stainless steel. In addition, the insulated double-walled configuration of the container 30 limits the amount of heat transfer from the container 30, thereby maintaining processed foods at a desired temperature for an extended period of time.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A container configured for use with a food processing system, comprising:
   a container body configured to be removably coupled with a food processing base, the container body including an interior wall and an exterior wall, said interior wall and said exterior wall being arranged in contact at a first end, wherein at least one of said interior wall and said exterior wall is formed from a non-resilient material, wherein said non-resilient material is a stainless steel material, wherein a portion of the container body forms a pressure relief mechanism; and
   a chamber defined by said container body.

2. The container according to claim 1, wherein a space is formed between at least a portion of said interior wall and said exterior wall, said space being filled with an insulating material.

3. The container according to claim 1, wherein both said interior wall and said exterior wall are formed from a non-resilient material.

4. The container according to claim 3, wherein the said non-resilient material of said interior wall is substantially identical to said non-resilient material of said exterior wall.

5. The container according to claim 3, wherein said non-resilient material of said interior wall is different than said non-resilient material of said exterior wall.

6. The container according to claim 1, wherein at least one of said interior wall and said exterior wall is formed from a plastic material.

7. The container according to claim 1, wherein said interior wall and said exterior wall are formed from a single piece of material.

8. The container according to claim 1, wherein said interior wall and said exterior wall are arranged in contact at a second end.

9. The container according to claim 1, wherein said container body includes a protrusion formed in said interior wall.

10. The container according to claim 1, wherein said container body includes a recess formed in said exterior wall, said recess extending towards said chamber.

11. The container according to claim 1, wherein said container body further comprises at least one marking for indicating one or more volumes associated with said chamber.

12. The container according to claim 1, further comprising a collar configured to associate said container body with said food processing base, said collar being formed from a resilient material.

13. The container according to claim 1, further comprising a cutting assembly configured to couple to said container body and operably couple said container body with said food processing base, wherein at least a portion of said cutting assembly is formed from a resilient material.

14. The container according to claim 1, wherein the pressure relief mechanism is configured to reduce a pressure of said chamber when said pressure exceeds a defined pressure threshold.

15. The container according to claim 14, wherein said defined pressure threshold is between 2 and 7 psi.

16. The container according to claim 14, wherein said pressure relief mechanism is configured to deform when said pressure within said chamber exceeds said defined pressure threshold.

* * * * *